(12) United States Patent
Lee et al.

(10) Patent No.: US 10,363,663 B2
(45) Date of Patent: Jul. 30, 2019

(54) ELECTRONIC DEVICE AND CRADLE THEREOF

(71) Applicant: Samsung Electronics Co., Ltd., Suwon-si (KR)

(72) Inventors: So Hee Lee, Seoul (KR); Won Ho Shin, Suwon-si (KR); Kyung Shik Roh, Seongnam-si (KR); Soon Yong Park, Bucheon-si (KR); Joong Kyung Park, Suwon-si (KR); Suk June Yoon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 172 days.

(21) Appl. No.: 15/248,256

(22) Filed: Aug. 26, 2016

(65) Prior Publication Data

US 2017/0165840 A1    Jun. 15, 2017

(30) Foreign Application Priority Data

Dec. 15, 2015  (KR) .......................... 10-2015-0179300

(51) Int. Cl.
*G03B 17/02* (2006.01)
*H04N 5/225* (2006.01)
(Continued)

(52) U.S. Cl.
CPC ......... *B25J 9/1697* (2013.01); *B25J 11/0005* (2013.01); *G06F 3/16* (2013.01); *G06K 9/00255* (2013.01); *G06K 9/00771* (2013.01); *G06K 9/3208* (2013.01); *H04N 5/2257* (2013.01); *G08C 17/02* (2013.01)

(58) Field of Classification Search
CPC .......................... B25J 9/1697; G06K 9/00255
See application file for complete search history.

(56) References Cited

U.S. PATENT DOCUMENTS 8,537,273 B2 *  9/2013  Dalton ............... H04N 5/23293
                                                   348/207.1
2006/0104633 A1  5/2006  Kenoyer et al.
(Continued)

FOREIGN PATENT DOCUMENTS

JP    2006-26761    2/2006
JP    2014-503376   2/2014
(Continued)

OTHER PUBLICATIONS

International Search Report dated Dec. 13, 2016 in International Patent Application No. PCT/KR2016/009694.
(Continued)

*Primary Examiner* — Minh Q Phan
(74) *Attorney, Agent, or Firm* — Staas & Halsey LLP

(57) ABSTRACT

An electronic device, capable of being placed on a cradle, may include a camera module configured to acquire an image, a sensor module configured to sense information regarding an orientation of the electronic device, a processor configured to determine a target orientation of the electronic device based on the acquired image and a communication module configured to transmit the information regarding the orientation of the electronic device and information regarding the target orientation of the electronic device to the cradle.

13 Claims, 17 Drawing Sheets

(51) Int. Cl.
*B25J 9/16* (2006.01)
*B25J 11/00* (2006.01)
*G06F 3/16* (2006.01)
*G06K 9/00* (2006.01)
*G06K 9/32* (2006.01)
G08C 17/02 (2006.01)

(56) References Cited

U.S. PATENT DOCUMENTS

| | | |
|---|---|---|
| 2010/0067072 A1 | 3/2010 | Lefevere |
| 2012/0062691 A1 | 3/2012 | Fowler et al. |
| 2012/0229300 A1 | 9/2012 | Fu |
| 2014/0050359 A1* | 2/2014 | Takahashi ............ G06K 9/4671 382/103 |
| 2014/0267775 A1 | 9/2014 | Lablans |
| 2014/0277735 A1 | 9/2014 | Breazeal |
| 2015/0288857 A1 | 10/2015 | Fay et al. |

FOREIGN PATENT DOCUMENTS

| | | |
|---|---|---|
| KR | 10-2013-0101201 | 9/2013 |
| WO | 2011/140501 | 11/2011 |

OTHER PUBLICATIONS

Partial European Search Report dated Jun. 19, 2018 in European Patent Application No. 16875878.7.
Extended European Search Report dated Sep. 20, 2018 in European Patent Application No. 16875878.7.

\* cited by examiner

ELECTRONIC DEVICE AND CRADLE THEREOF

CROSS-REFERENCE TO RELATED APPLICATIONS

This application claims the priority benefit of Korean Patent Application No. 10-2015-0179300, filed on Dec. 15, 2015 in the Korean Intellectual Property Office, the disclosure of which is incorporated herein by reference in its entirety.

BACKGROUND

1. Field

The following description relates to an electronic device and a cradle thereof, and more particularly, to an electronic device and a cradle thereof, wherein the cradle is connected in a wireless fashion to the electronic device when the electronic device is placed on the cradle to thus control an orientation of the electronic device.

2. Description of the Related Art

With development of communication and computer technologies, an intelligent electronic device which can recognize a peripheral environment, provide necessary information to a user through interaction with the user, and drive a separate driver to move to a desired location has been developed. The intelligent electronic device can perform operations of giving a user a sense of intimacy or of showing a reaction through the driver, and also can recognize the user's face or voice to respond to the user's motion, voice, etc.

The intelligent electronic device can be in the shape of a mobile robot. However, the mobile robot has spatial limitation and low portability so that a user has difficulties in possessing it.

SUMMARY

Therefore, it is an aspect of the present disclosure to provide an electronic device and a cradle thereof, wherein the electronic device has an outer appearance allowing a user to easily possess it, and a motion of the electronic device can be controlled by a driver included in the cradle when the electronic device is placed on the cradle.

Additional aspects of the disclosure will be set forth in part in the description which follows and, in part, will be obvious from the description, or may be learned by practice of the disclosure.

In accordance with an aspect of the present disclosure, an electronic device capable of being placed on a cradle, may include a camera module configured to acquire an image, a sensor module configured to sense information regarding an orientation of the electronic device, a processor configured to determine a target orientation of the electronic device based on the acquired image and a communication module configured to transmit the information regarding the orientation of the electronic device and information regarding the target orientation of the electronic device to the cradle.

The electronic device may further include a microphone configured to receive voice. The processor may determine the target orientation of the electronic device based on a direction in which the voice received by the microphone utters.

The communication module may transmit at least one of information regarding velocity or acceleration with respect to a motion of the electronic device to the cradle.

If a user is recognized from the acquired image, the processor may determine the target orientation of the electronic device such that the user is located in the center of an image acquired by the camera module.

The processor may determine that the electronic device is placed on the cradle, through the sensor module.

In accordance with an aspect of the present disclosure, a cradle on which an electronic device is placed, may include a communication unit, at least one driving leg configured to be rotatable, a stand on which the at least one driving leg is mounted, a driver configured to control a rotation direction and rotation velocity of the driving leg and a controller configured to control the driver based on data received from the electronic device through the communication unit.

The received data may include information regarding a current orientation of the electronic device and information regarding a target orientation of the electronic device. The controller may control the driver to change at least one of a rotation direction, rotation velocity, and rotation torque of the driving leg, based on the information regarding the current orientation of the electronic device and the information regarding the target orientation of the electronic device.

The driving leg may physically contact an outer surface of the electronic device, and rotates to change an orientation of the electronic device.

If no information regarding an orientation of the electronic device is received through the communication unit, the controller may control the driver based on previously received information regarding an orientation of the electronic device.

In accordance with an aspect of the present disclosure, an electronic device capable of being placed on a cradle may include a display; a camera module configured to acquire an image in a direction which the display faces; a processor configured to determine a target orientation of the electronic device based on the acquired image, and to create control data for changing an orientation of the electronic device to the target position; and a communication module configured to transmit the control data.

In accordance with an aspect of the present disclosure, a method of controlling an electronic device capable of being placed on a cradle, may include acquiring an image, sensing information regarding an orientation of the electronic device through a sensor module, determining, if a user is recognized from the image, a target orientation of the electronic device such that an image of the user is located in the center of a screen, and transmitting the information regarding the orientation of the electronic device and information regarding the target orientation of the electronic device to the cradle.

The method may further include determining the target orientation of the electronic device based on a direction in which voice received by a microphone utters.

The method may further include transmitting at least one of information regarding velocity or acceleration with respect to a motion of the electronic device to the cradle.

The method may further include determining that the electronic device is placed on the cradle, based on data output from the sensor module.

The method may further include determining that the electronic device is placed on the cradle, based on a signal received from the cradle.

In accordance with an aspect of the present disclosure, a method of controlling a cradle on which an electronic device is placed, may include receiving control data from the electronic device and controlling a rotation direction and rotation velocity of at least one driving leg based on the received control data.

The control data may include information regarding an orientation of the electronic device and information regarding a target orientation of the electronic device.

The method may further include controlling the driver based on previously received information regarding an orientation of the electronic device if no information regarding an orientation of the electronic device is received from the electronic device.

The at least one driving leg may rotate to change an orientation of the electronic device.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
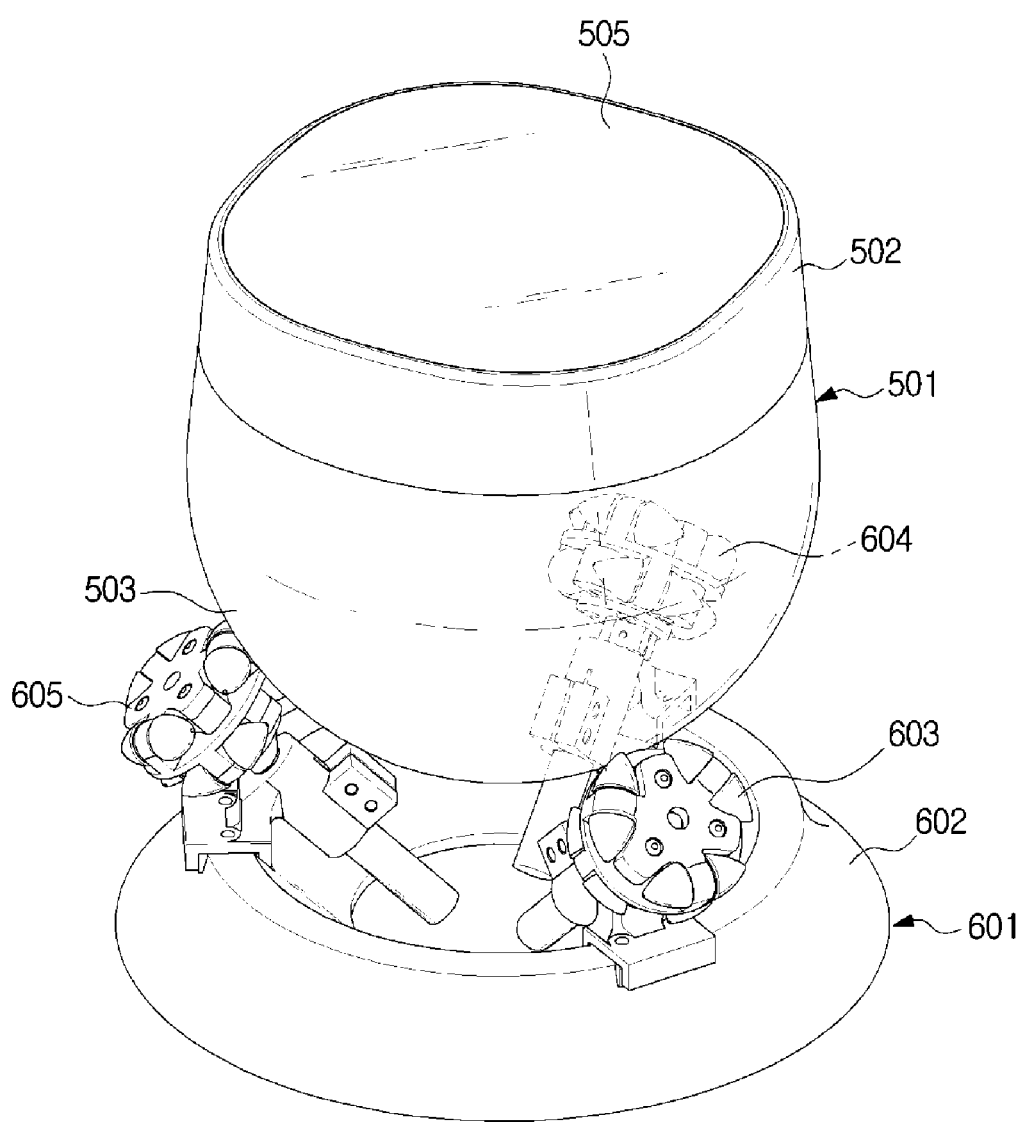
FIG. 1 shows an electronic device and a cradle according to an embodiment.

Reference will now be made in detail to the embodiments, examples of which are illustrated in the accompanying drawings, wherein like reference numerals refer to like elements throughout. The embodiments are described below to explain the present disclosure by referring to the figures.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" refers to any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged washing machine technologies. Hereinafter, an embodiment of the present disclosure will be described in detail with reference to the accompanying drawings.

Hereinafter, an electronic device according to various embodiment of the present disclosure will be described in detail with reference to the accompanying drawings. In the present disclosure, a term "user" may indicate a person who uses the electronic device or a device (for example, an artificial intelligence electronic device) which uses the electronic device.

FIG. 1 shows an electronic device and a cradle according to an embodiment.

In FIG. 1, an electronic device 501 and a cradle 601 are shown.

The electronic device 501 may include a head part 502 and a body part 503.

The head part 502 may be disposed above the body part 503. According to an embodiment, the head part 502 and the body part 503 may be shaped to respectively correspond to a human's head and body. For example, the head part 502 may include a front cover 505 to correspond to a human's face shape.

On the front cover 505 of the electronic device 501, an arbitrary image may be displayed. In order to display an arbitrary image on the front cover 505 of the electronic device 501, the electronic device 501 may include a display 512 disposed at a location corresponding to the front cover 505.

For example, the display may be disposed in the inside of the front cover 505, and the front cover 505 may be made of a transparent material or a translucent material in order to transmit images displayed on the display.

The front cover 505 may be a device capable of displaying arbitrary images. That is, the front cover 505 may itself display arbitrary images. In this case, the front cover 505 and the display may be implemented as single hardware.

The head part 502 may include at least one hardware component or structure that is directed to a user's direction when it interacts with the user.

Specifically, the head part 502 may include at least one sensor 240 to acquire information in the user's direction, and at least one output unit 280 to output information in the user's direction.

For example, the head part 502 may include at least one camera module 291 to acquire an image in a direction in which it interacts with the user, and at least one microphone 288 to acquire audio in the direction. Furthermore, the head part 502 may include at least one speaker 282 to output audio in the direction in which it interacts with the user, a mechanical eye structure (not shown), and a display 260 to display images. Furthermore, the direction in which the head part 502 interacts with the user may be displayed by light or through a transient mechanical change.

The head part 502 may further include a communication module 220, a sensor module 240, and a camera module 291. The communication module may receive a message from an external electronic device, and transmit a message to an external electronic device.

The sensor module may acquire information regarding an external environment.

For example, the sensor module may sense a user's approach to the electronic device 501. Specifically, the sensor module may sense a user's body to thereby sense the user's approach. Furthermore, the sensor module may sense a user's approach based on a signal from another electronic device (for example, a wearable device or a smart phone) which the user uses. Furthermore, the sensor module may sense a user's motion or location.

The camera module may photograph an external environment. In this case, the electronic device 501 may identify a user based on the result of photographing by the camera module.

The body part 503 may have an outer appearance in the shape of a hemisphere, and include a wireless power receiver 295a and a battery 296. The electronic device 501 may wirelessly receive power from the cradle 601 through the wireless power receiver to charge the battery.

The body part 503 may physically contact the cradle 601 without any terminal for electrically connecting to the cradle 601.

Because the outer appearance of the body part 503 is in the shape of a hemisphere, the electronic device 501 may move in up, down, left, and right directions or in all directions, like a human body's joint, when the electronic device 501 is placed on the cradle 601. That is, when the electronic device 501 is placed on the cradle 601, the electronic device 501 can move in 3 Dimensional (3D) space so that the head part 502 faces various directions.

The cradle 601 may include a stand 602 and a plurality of driving legs 603, 604, and 605.

The stand 602 may have a circle shape although is not limited to this. The stand 602 may have a triangular shape, a quadrangular shape, or a polygonal shape.

The cradle 601 may include at least three driving legs 603, 604, and 605 (e.g., referred to as a first driving leg 603, a second driving leg 604, and a third driving leg 605) mounted on the upper surface of the stand 602.

The three driving legs 603, 604, and 605 may be arranged in a radial form from the center of the stand 602, wherein the distances between the driving legs 603, 604, and 605 may be the same. For example, the first driving leg 603, the second driving leg 604, and the third driving leg 605 may be arranged at the same interval.

When the electronic device 501 is placed on the cradle 601, the body part 503 of the electronic device 501 may contact the plurality of driving legs 603, 604, and 605. The respective driving legs 603, 604, and 605 may be rotated by a motor, and may include a plurality of wheels.

The plurality of wheels may contact the body part 503 of the electronic device 501 so that the electronic device 501 can move smoothly. In other words, when the electronic device 501 moves by rotation of the plurality of driving legs 603, 604, and 605, the plurality of wheels may serve as bearings for smoothly moving the electronic device 501.

The wheels may be made of rubber or silicon although not limited to these. That is, the wheels may be made of a material capable of maintaining a friction force.

Because the body part 503 of the electronic device 501 is in the shape of a hemisphere, and the driving legs 603, 604, and 605 contacting the body part 503 of the electronic device 501 are arranged at the same interval, the head part 502 of the electronic device 501 can face a desired direction stably and quickly in 3D space.

Furthermore, because the body part 503 of the electronic device 501 is in the shape of a hemisphere, and the driving legs 603, 604, and 605 contacting the body part 503 of the electronic device 501 are arranged at the same interval, the electronic device 501 can be functionally coupled with the cradle 601 only by placing the electronic device 501 on the cradle 601 without having to consider the direction and position of the electronic device 501. Herein, "functionally coupled" means that two objects physically separated are coupled to be able to operate like a single product.

The cradle 601 may include a wireless power transmitter. When the electronic device 501 is placed on the cradle 601, the wireless power transmitter may wirelessly transmit power to the electronic device 501 to charge the battery included in the electronic device 501.

Figure 2:
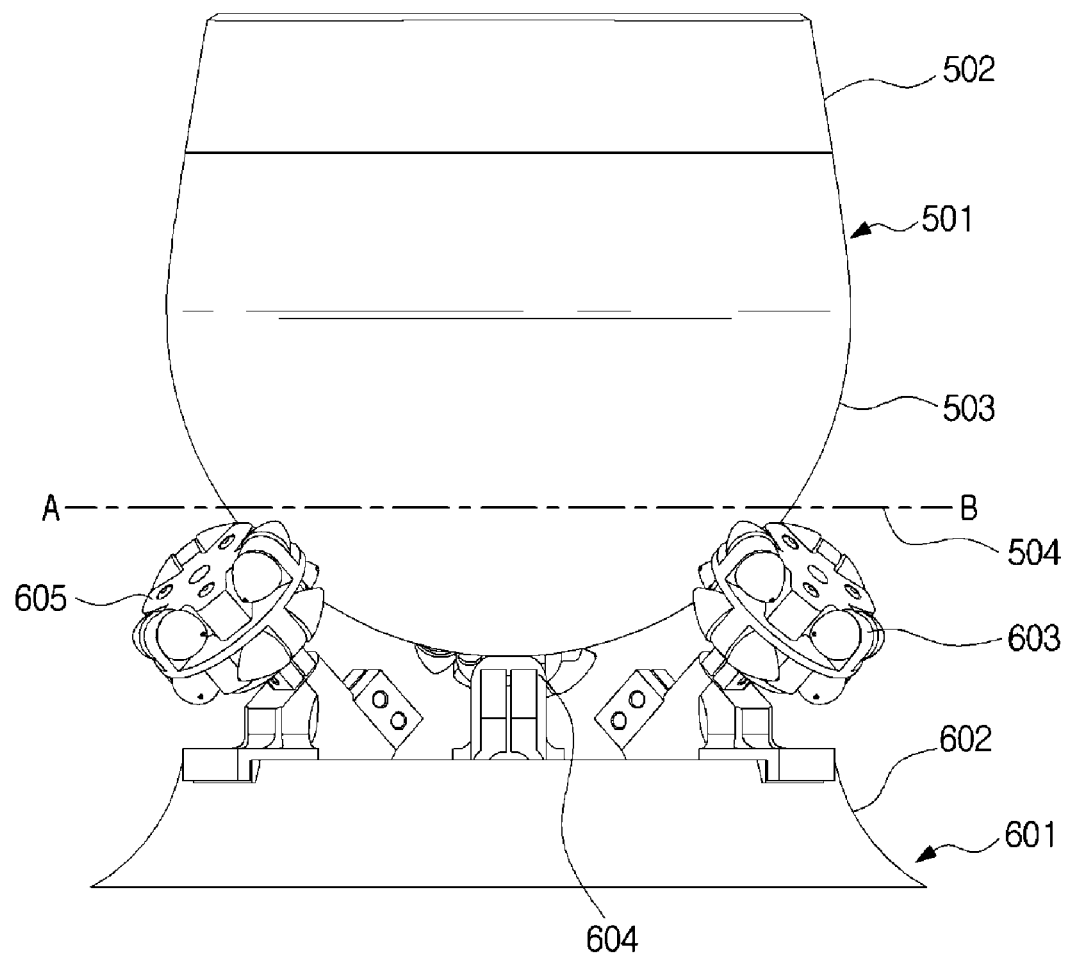
FIG. 2 is a side view showing a state in which an electronic device according to an embodiment is placed on a cradle.

FIG. 2 is a side view showing a state in which an electronic device according to an embodiment is placed on a cradle.

In FIG. 2, the electronic device 501 and the cradle 601 are shown. Referring to FIG. 2, the electronic device 501 may be placed on the cradle 601 such that the front cover 505 faces the up direction.

The body part 503 of the electronic device 501 may contact the driving legs 603, 604, and 605 of the cradle 601, and receive a rotational force from the plurality of wheels included in the driving legs 603, 604, and 605, thereby moving in a desired direction.

The driving legs 603, 604, and 605 may be arranged at a predetermined angle to the upper surface of the stand 602. In order to support the body part 503 stably, an angle (621 of FIG. 3) between the driving legs 603, 604, and 605 and the upper surface of the stand 602 may be smaller than 90 degrees.

When the electronic device 501 is placed vertically on the cradle 601, locations at which the body part 503 of the electronic device 501 contacts the driving legs 603, 604, and 605 may be on or below a center line (AB) 504 of the hemisphere surface forming the body part 503.

If an antenna of the wireless power receiver included in the body part 503 of the electronic device 501 is disposed at the lower end of the hemisphere surface of the body part 503, the efficiency of charging can increase when the electronic device 501 is placed vertically on the cradle 601. Furthermore, if the antenna of the wireless power receiver is disposed at an arbitrary location of the hemisphere surface of the body part 503, the electronic device 501 may control the driver of the cradle 601 to adjust its own position, in order to increase the efficiency of charging.

Figure 3:
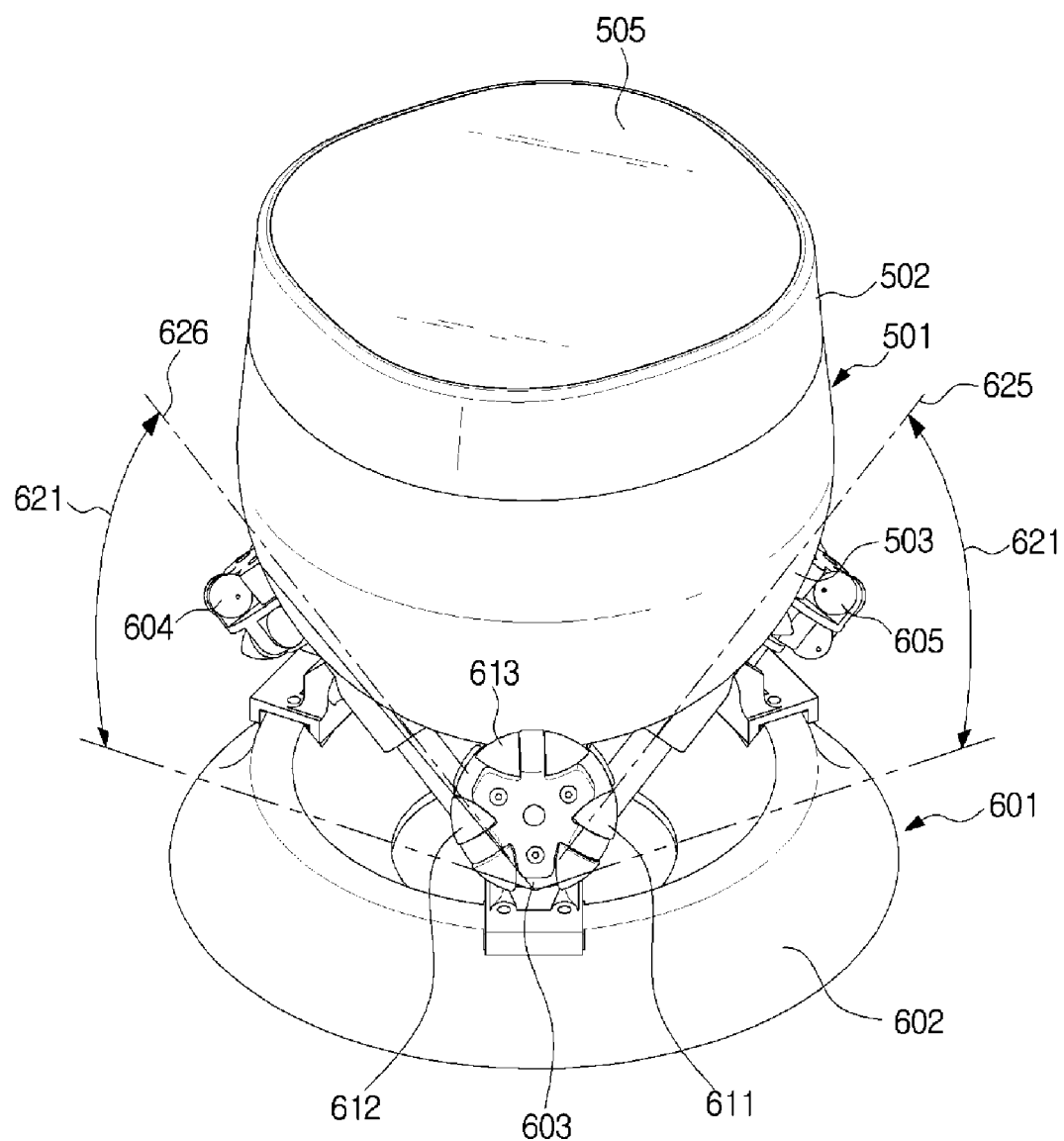
FIG. 3 is a perspective view showing a state in which an electronic device according to an embodiment is placed on a cradle.

FIG. 3 is a perspective view showing a state in which an electronic device according to an embodiment is placed on a cradle.

In FIG. 3, the electronic device 501 and the cradle 601 are shown.

The head part 502 of the electronic device 501 may include the front cover 505. The body part 503 of the electronic device 501 may have a hemisphere surface.

The electronic device 501 may be separated from the cradle 601 so that a user can possess only the electronic device 501.

In the cradle 601, the plurality of driving legs 603, 604, and 605 may be disposed to move the electronic device 501.

The plurality of driving legs 603, 604, and 605 may be arranged in a radial form from the center of the stand 602 so as to support the hemisphere surface of the electronic device 501. Furthermore, the driving legs 603, 604, and 605 may be mounted on the stand 602 at a predetermined angle 621 with respect to the bottom of the stand 602. In the current embodiment, three driving legs 603, 604, and 605 are provided. However, four driving legs or more may be provided.

The driving legs 603, 604, and 605 may be arranged at the same interval so as to stably support the hemisphere surface of the electronic device 501. That is, the distance between the first driving leg 603 and the second driving leg 604 may be the same as those between the second driving leg 604 and the third driving leg 605 and between the third driving leg 605 and the first driving leg 603.

An angle 621 which the second driving leg 604 makes to the bottom of the stand 602, an angle 621 which the third driving leg 605 makes to the bottom of the stand 602, and an angle (not shown) which the first driving leg 603 makes to the bottom of the stand 602 may be the same.

Each of the driving legs 603, 604, and 605 may include a plurality of wheels.

For example, the first driving leg 603 may include a plurality of wheels 611, 612, and 613. In the current embodiment, each of the driving legs 603, 604, and 605 includes three wheels. However, each of the driving legs 603, 604, and 605 may include four or more wheels or two or less wheels.

When the first driving leg 603 has three wheels 611, 612, and 613, the wheels 611, 612, and 613 may be disposed at an angle of 120 degrees.

The driving legs 603, 604, and 605 may rotate. For example, the third driving leg 605 may rotate in a clockwise or counterclockwise direction on a third rotation axis 625. Furthermore, the second driving leg 604 may rotate in the clockwise or counterclockwise direction on a second rotation axis 626. Likewise, the first driving leg 603 may also rotate in the clockwise or counterclockwise direction on a first rotation axis (not shown).

Figure 4:
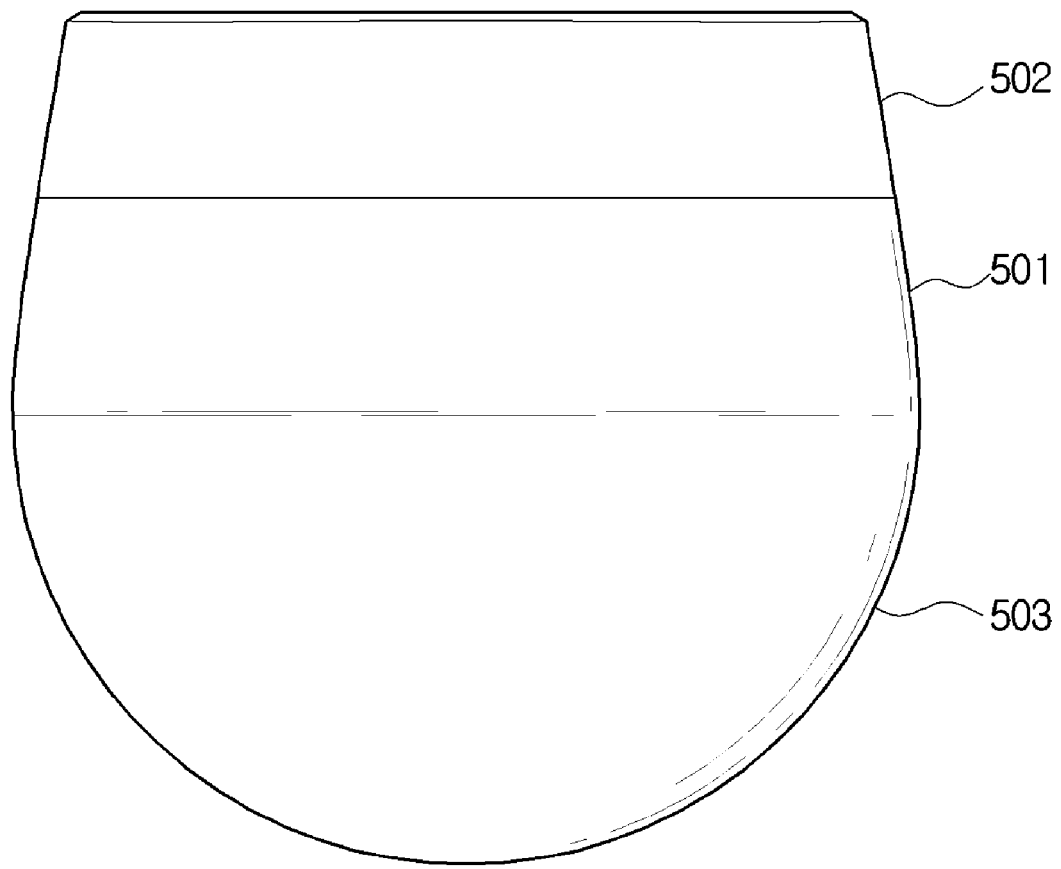
FIG. 4 is a side view of an electronic device according to an embodiment.

FIG. 4 is a side view of an electronic device according to an embodiment.

Referring to FIG. 4, the electronic device 501 may include the head part 502 and the body part 503. The body part 503 may be in the shape of a hemisphere, and have a hemisphere surface. Furthermore, the body part 503 may have a part of a hemisphere surface. The circumference of the head part 502 may be smaller than or equal to that of the body part 501.

Figure 5:
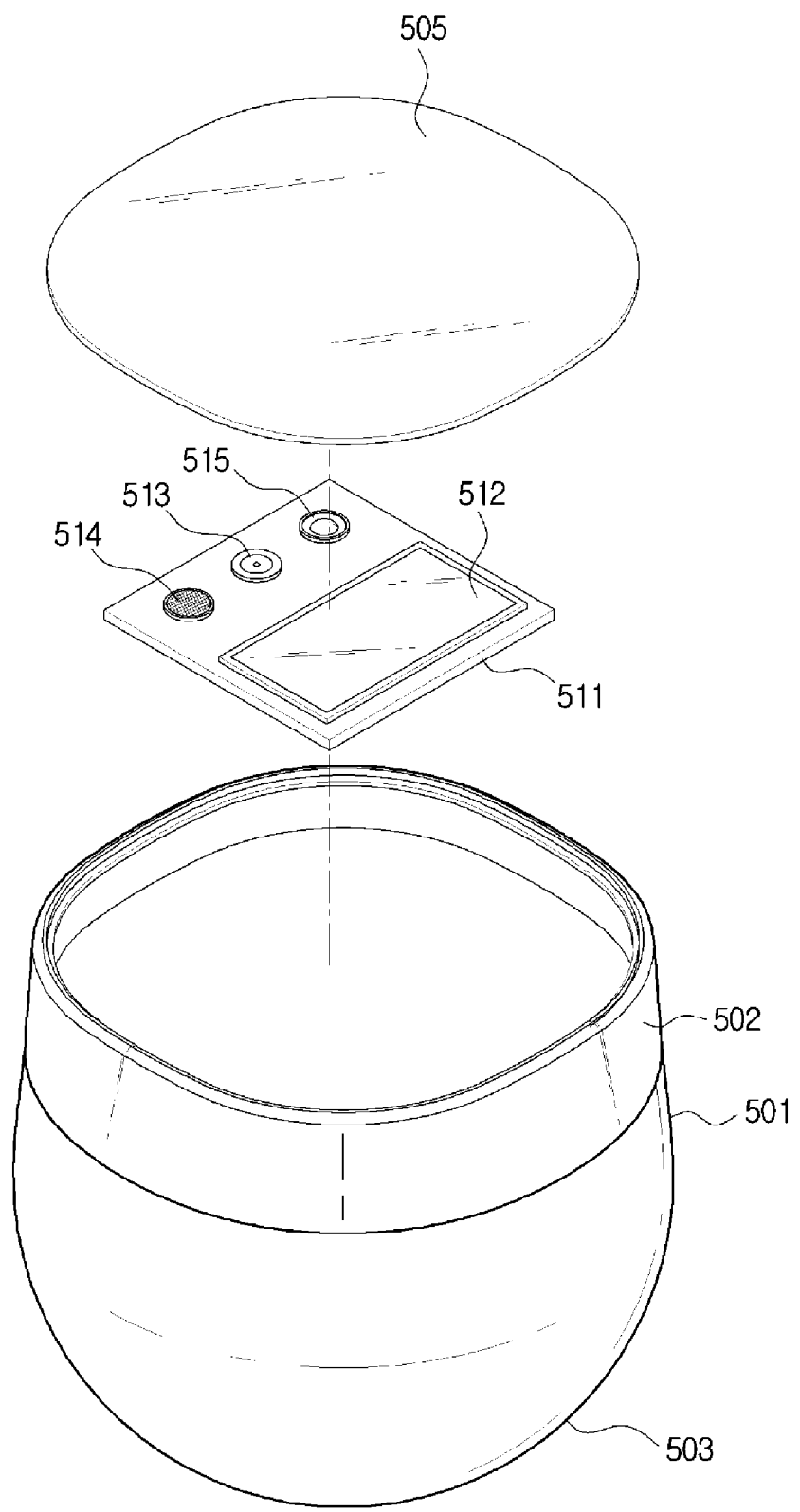
FIG. 5 is a perspective view of an electronic device according to an embodiment.

FIG. 5 is a perspective view of an electronic device according to an embodiment.

Referring to FIG. 5, the body part 503 of the electronic device 501 may be in the shape of a hemisphere, and the head part 502 of the electronic device 501 may be in the shape of a quadrangle with rounded edges. However, the head part 502 may be in the shape of a circle or another polygon.

The head part 502 may include the front cover 505, and the front cover 505 may perform operations corresponding to a human's face.

In the inside of the front cover 505, various devices such as a display may be installed.

For example, in the inside of the front cover 505, a Printed Circuit Board (PCB) 511, on which a display 512, a camera 513, a microphone 514, and a speaker 515 are mounted, may be installed. That is, the display 512, the camera 513, the microphone 514, and the speaker 515 may be mounted on the same PCB 511.

The PCB 511 may be disposed in parallel to the front cover 505. Accordingly, the display 512 may also be disposed in parallel to the front cover 505, and display various images. Furthermore, images displayed on the display 512 may be transmitted through the front cover 505 so that a user can see the images transmitted through the front cover 505.

The camera 513 may be disposed adjacent to the display 512 on the PCB 511, and a photographing direction of the camera 513 may be the same direction which the display 512 faces.

The microphone 514 may be disposed adjacent to the display 512 on the PCB 511, and a direction in which the microphone 514 faces may also be the same direction which the camera 513 and the display 512 face.

The speaker 515 may be disposed adjacent to the display 512 on the PCB 511, and a direction in which the speaker 515 outputs sound may also be the same direction which the display 512 faces.

Figure 6:
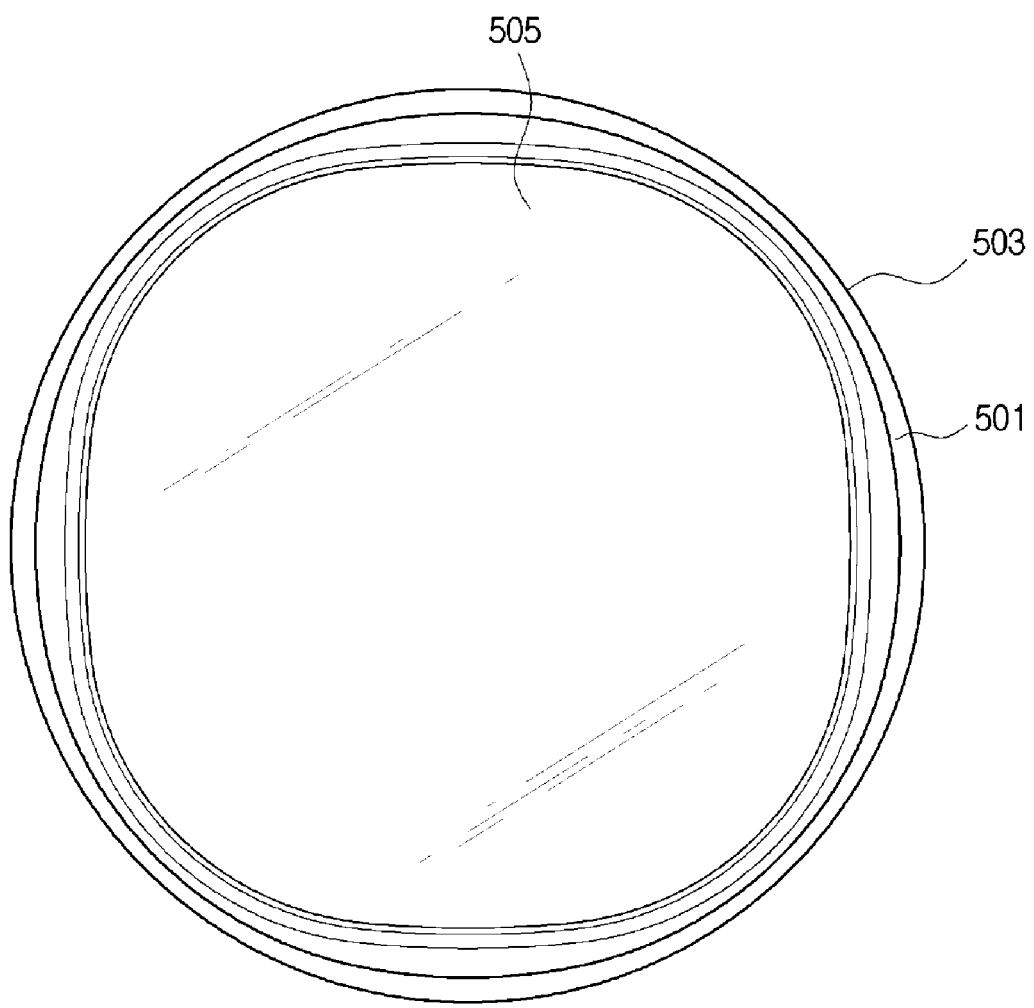
FIG. 6 is a top view of an electronic device according to an embodiment.

FIG. 6 is a top view of an electronic device according to an embodiment.

Referring to FIG. 6, the front cover 505 of the head part 502 may be in the shape of a quadrangle with rounded edges, and the body part 503 of the electronic device 501 may be in the shape of a circle. According to an embodiment, the size of the front cover 505 may be smaller than that of the body part 503, although not limited to this.

According to an embodiment, a display may be installed in the inside of the front cover 505 so that the electronic device 501 can perform various interactions with a user through the display. Furthermore, according to another embodiment, the front cover 505 may itself serve as a display.

Figure 7:
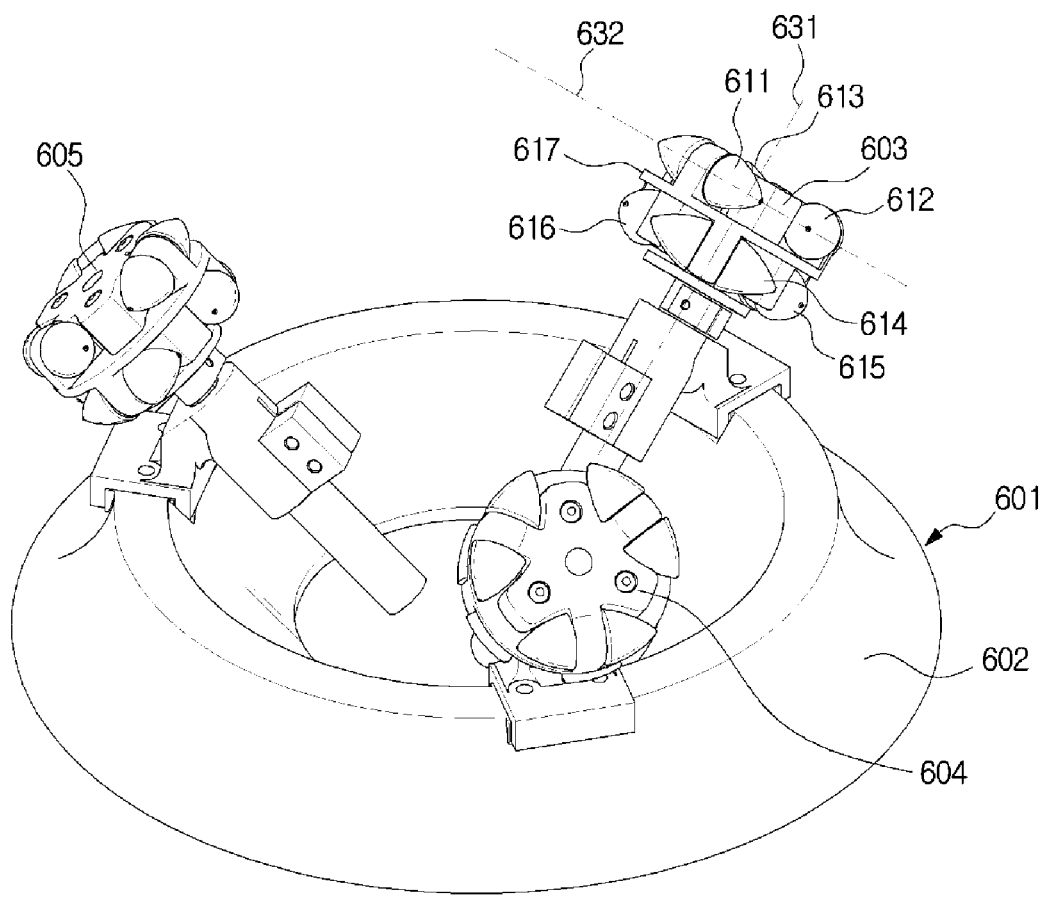
FIG. 7 shows a cradle according to an embodiment.

FIG. 7 shows a cradle according to an embodiment.

Referring to FIG. 7, the driving legs 603, 604, and 605 may be mounted on the stand 602 of the cradle 601.

The driving legs 603, 604, and 605 may be arranged with an angle of 120 degrees in a radial form from the center of the stand 602.

The driving legs 603, 604, and 605 may rotate on their main rotation axes, respectively. For example, the first driving leg 603 may rotate clockwise or counterclockwise on a main rotation axis 631, the second operation leg 604 may rotate clockwise or counterclockwise on a main rotation axis 626 (see. FIG. 3), and the third operation leg 605 may rotate clockwise or counterclockwise on a main rotation axis 625 (see. FIG. 3).

Each of the driving legs 603, 604, and 605 may include a plurality of wheels. For example, the first driving leg 603 may include a plurality of wheels 611, 612, 613, 614, 615, and 616.

The plurality of wheels 611, 612, 613, 614, 615, and 616 of the first driving leg 603 may be divided into three upper wheels 611, 612, and 613 and three lower wheels 614, 615, and 616 with an intermediate frame 617 in between.

The intermediate frame 617 may rotate on the main rotation axis 631, together with the first driving leg 603.

The upper wheels 611, 612 and 613 and the lower wheels 614, 615, and 616 may rotate on secondary rotation axes, respectively. For example, the upper wheel 611 of the first driving leg 603 may rotate on a secondary rotation axis 632.

The main rotation axis of the first driving leg 603 may be perpendicular to the secondary rotation axes of the plurality of wheels 611, 612, 613, 614, 615, and 616. In other words, each of the driving legs 603, 604, and 605 may rotate on its own rotation axis, and include the plurality of wheels 611, 612, 613, 614, 615, and 616 capable of rotating on rotation axes that are perpendicular to the rotation axis of the corresponding driving leg 603, 604, or 605.

Accordingly, the electronic device 501 supported by the driving legs 603, 604, and 605 can rotate freely in all directions in 3D space.

The driving legs 603, 604, and 605 may receive a rotational force from a motor. That is, the driving legs 603, 604, and 605 may change the location and/or orientation of the electronic device 501 by receiving a rotational force from the motor.

The plurality of wheels 611, 612, 613, 614, 615, and 616 included in each of the driving legs 603, 604, and 605 may be rotated by a motion (a change in location and/or orientation) of the electronic device 501. That is, the plurality of wheels 611, 612, 613, 614, 615, and 616 may serve as bearings for enabling the electronic device 501 to be moved smoothly by the driving legs 603, 604, and 605.

According to an embodiment, the cradle 601 may include a motor to rotate the plurality of wheels 611, 612, 613, 614, 615, and 616 included in each of the driving legs 603, 604, and 605.

Figure 8:
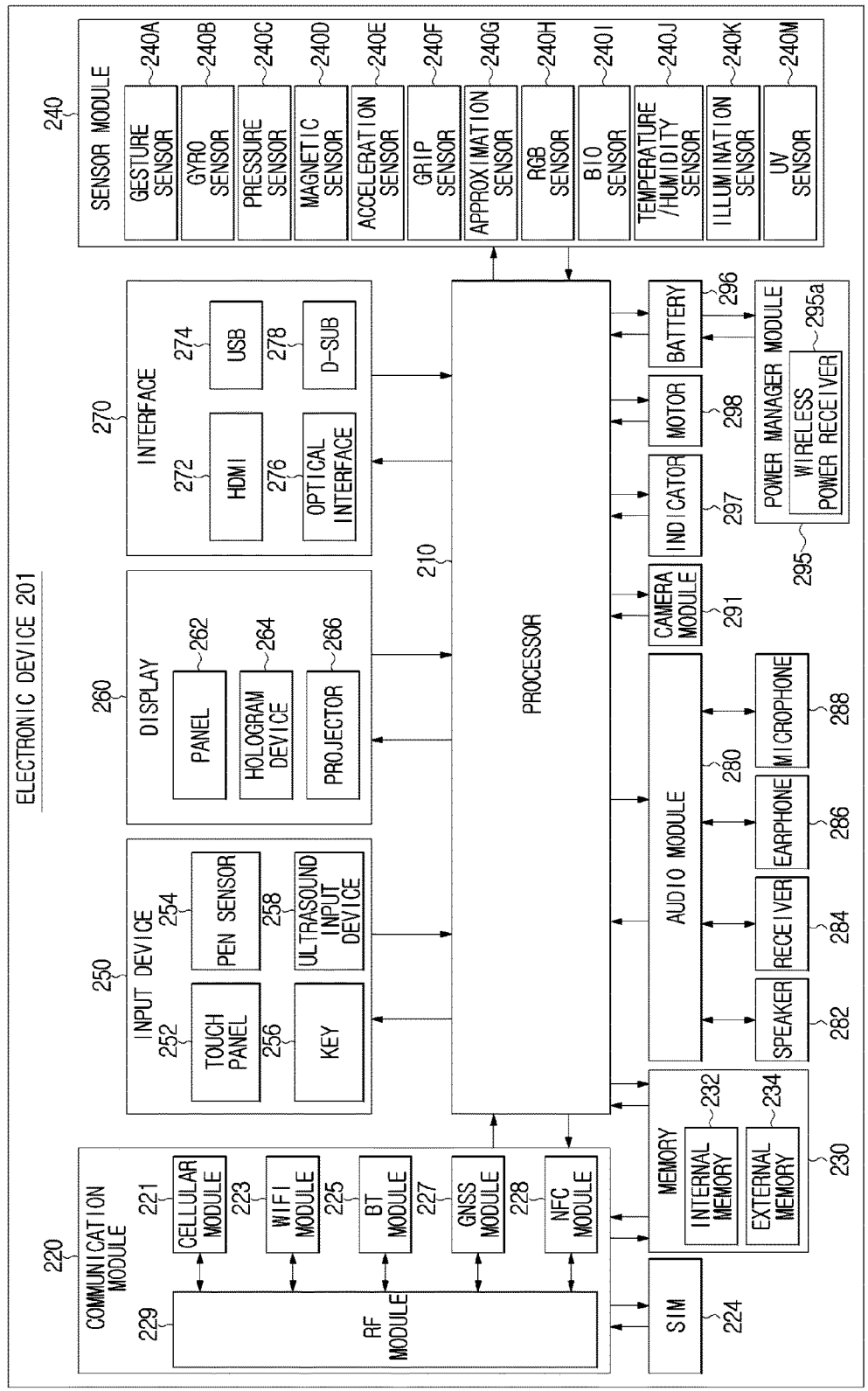
FIG. 8 is a block diagram of an electronic device according to an embodiment.

FIG. 8 is a block diagram of an electronic device according to an embodiment.

Referring to FIG. 8, an electronic device 201 may include at least one Application Processor (AP) 210, a communication module 220, a subscriber identification module 224, a memory 230, a sensor module 240, an input unit 250, a display 260, an interface 270, an audio module 280, a camera module 291, a power management module 295, a battery 296, an indicator 297, and a motor 298.

The processor 210 may drive, for example, Operating System (OS) or an application program to control a plurality of hardware to which the processor 210 is connected and a plurality of software components stored in the memory 230, and the processor 210 may also perform various data processing and calculations.

The processor 210 may be implemented as, for example, System on Chip (SoS).

According to an embodiment, the processor 210 may further include a Graphic Processing Unit (GPU) and/or an image signal processor. Furthermore, according to an embodiment, the processor 210 may include at least one part (for example, a cellular module 221) of the components shown in FIG. 8.

The processor 210 may load instruction and/or data received from at least one of the other components (for example, a non-volatile memory) in a volatile memory, process the instruction and/or data, and then store the processed data in the non-volatile memory.

The processor 210 may determine a target orientation of the electronic device 201 such that the electronic device 201 faces a user, and transmit information regarding a current orientation of the electronic device 201 and information regarding the target orientation to an external device.

If a user is recognized from an image acquired through the camera module 291, the processor 210 may determine a target orientation of the electronic device 201 such that the user can be positioned in the center of an image acquired by the camera module 291. The processor 210 may transmit the information regarding the current orientation of the electronic device 201 and the information regarding the target orientation of the electronic device 201 to the external device through the communication module 220.

If a user is recognized from an image acquired through the camera module 291, the processor 210 may create control data for changing the orientation of the electronic device 201 such that the user can be positioned in the center of an image acquired by the camera module 291. Specifically, the processor 210 may acquire information regarding a current orientation of the electronic device 201 through a gyro sensor, determine a target orientation of the electronic device 201 from an image acquired through the camera module 220, and then calculate a difference between the target orientation and the current orientation to thereby change the orientation of the electronic device 201.

If no user is recognized from the image acquired through the camera module 291, the processor 210 may change the orientation of the electronic device 201 to a predetermined range. For example, the processor 210 may transmit data for changing the orientation of the electronic device 201 to the cradle 601 through the communication module 220, so that the current orientation of the electronic device 201 changes to a range of +30 degrees to −30 degrees in the upper, lower, left, and right directions. The processor 210 may acquire an image through the camera module 291, and then determine whether a user exists in the acquired image.

The processor 210 may determine a target orientation of the electronic device 201 based on a direction in which voice input to a microphone utters. Herein, the utterance direction of the voice may correspond to a user's location. For example, the processor 210 may analyze voice input through the microphone to determine a user's location. Specifically, the processor 210 may detect a voice signal corresponding to a user from voice signals input through the microphone, and determine a target orientation of the electronic device 201 at which the magnitude of the voice signal corresponding to the user can be maximized. Furthermore, the processor 210 may determine an utterance direction of voice based on the magnitudes of voice signals received by a plurality of microphones (for example, a microphone array), and determine a target orientation of the electronic device 201 so that the electronic device 201 faces the utterance direction.

The processor 210 may determine whether the electronic device 201 is placed on the cradle 601, based on information sensed through the sensor module 240. For example, the processor 210 may determine whether the electronic device 201 is placed on the cradle 601, based on data output from an approximation sensor.

The communication module 220 may transmit data to an external device, and receive data from an external device. The communication module 220 may transmit information regarding a current orientation of the electronic device 201 and information regarding a target orientation of the electronic device 201 to an external device. Furthermore, the communication module 220 may transmit information regarding velocity and/or acceleration with respect to a motion of the electronic device 201 to the outside.

The communication module 220 may transmit control data for changing the orientation of the electronic device 201, created by the processor 210, to the external device.

The communication module 220 may include, for example, the cellular module 221, a Wireless Fidelity (WiFi) module 223, a Bluetooth module 225, a Global Navigation Satellite System (GNSS) module 227 (for example, a Global Positioning System (GPS) module, a Glonass module, a Beidou module, or a Galileo module), a Near Field Communication (NFC) module 228, and a Radio Frequency (RF) module 229.

The cellular module 221 may provide voice calls, video calls, a text message service, an Internet service, etc., for example, through a communication network.

According to an embodiment, the cellular module 221 may identify and authenticate the electronic device 201 in a communication network using a subscriber identification module (for example, a Subscriber Identification Module (SIM) card) 224. According to an embodiment, the cellular module 221 may perform at least one part of functions that can be provided by the processor 210. Furthermore, according to an embodiment, the cellular module 221 may include a Communication Processor (CP).

Each of the WiFi module 223, the Bluetooth module 225, the GNSS module 227, and the NFC module 228 may include a processor to process data transmitted or received through the corresponding module. According to an embodiment, at least one part (for example, two or more) of the cellular module 221, the WiFi module 223, the Bluetooth module 225, the GNSS module 227, and the NFC module 228 may be included in an Integrated Circuit (IC) or an IC package.

The RF module 229 may transmit and receive, for example, communication signals (for example, RF signals). According to an embodiment, the RF module 229 may transmit and receive communication signals of the cellular module 221, the WiFi module 223, the Bluetooth module 225, the GNSS module 227, and the NFC module 228.

The RF module 229 may include a transceiver, a Power Amp Module (PAM), a frequency filter, a Low Noise Amplifier (LNA), an antenna, etc.

According to an embodiment, at least one of the cellular module 221, the WiFi module 223, the Bluetooth module 225, the GNSS module 227, or the NFC module 228 may transmit and receive RF signals through a separate RF module.

The subscriber identification module 224 may include a card having a subscriber identification module, and/or an embedded SIM. The subscriber identification module 224 may include unique identification information (for example, Integrated Circuit Card Identifier (ICCID)) and/or subscriber information (for example, International Mobile Subscriber Identity (IMSI)).

The memory 230 may include, for example, an internal memory 232 and/or an external memory 234.

The internal memory 232 may include, for example, at least one of a volatile memory (for example, Dynamic Random Access Memory (DRAM), Static RAM (SRAM), or Synchronous Dynamic RAM (SDRAM), and the like) and a non-volatile memory (for example, One Time Programmable Read Only Memory (OTPROM), Programmable ROM (PROM), Erasable and Programmable ROM (EPROM), Electrically Erasable and Programmable ROM (EEPROM), mask ROM, flash ROM, a flash memory (for example, NAND flash or NOR flash), a hard drive, and/or a Solid State Driver (SSD)).

The external memory 234 may include a flash drive, for example, Compact Flash (CF), Secure Digital (SD), Micro Secure Digital (Micro-SD), Mini Secure Digital (Mini-SD), eXtreme Digital (xD), Multi-Media Card (MMC), a memory stick, etc. The external memory 234 may be functionally and/or physically connected to the electronic device 201 through various interfaces.

The sensor module 240 may measure physical quantity and/or sense the operating state and/or orientation information of the electronic device 201, and convert the measured and/or sensed information into an electrical signal. Furthermore, the sensor module 240 may sense information regarding velocity and/or acceleration with respect to a motion of the electronic device 201.

The sensor module 240 may include at least one of, for example, a gesture sensor 240A, a gyro sensor 240B, a pressure sensor 240C, a magnetic sensor 240D, an acceleration sensor 240E, a grip sensor 240F, an approximation sensor 240G, a color sensor 240H (for example, a RGB (Red, Green, Blue) sensor), a bio sensor 240I, a temperature/humidity sensor 240J, an illumination sensor 240K, and/or a Ultra Violet (UV) sensor 240M.

The gyro sensor 240B may sense information regarding a rotary motion (for example, angular velocity) of the electronic device 201, and the acceleration sensor 240E may sense information regarding an orientation (for example, a grade) and a linear motion (for example, linear acceleration) of the electronic device 201. Furthermore, a current orientation of the electronic device 201 may be determined based on the output of the gyro sensor 240B and the output of the acceleration sensor 240E.

The processor 210 may transmit information regarding the orientation of the electronic device 201, received from the sensor module 240, to an external device through the communication module 220.

Additionally or alternatively, the sensor module 240 may include, for example, an E-nose sensor, an electromyography (EMG) sensor, an electroencephalogram (EEG) sensor, an electrocardiogram (ECG) sensor, Infrared (IR) sensor, an iris sensor, and/or a fingerprint sensor.

The sensor module 240 may include such one or more sensors, and a control circuit for controlling the sensors. According to an embodiment, the electronic device 201 may further include a processor configured to control the sensor module 240, as a part of the processor 210 or separately from the processor 210. The processor may control the sensor module 240 when the processor 210 is in a sleep state.

The input unit 250 may include, for example, a touch panel 252, a (digital) pen sensor 254, a key 256, and an ultrasonic input unit 258.

The touch panel 252 may use, for example, at least one of a capacitive method, a resistive method, an infrared method, or an ultrasonic method. Furthermore, the touch panel 252 may further include a control circuit. According to an embodiment, the touch panel 252 may further include a tactile layer to provide a user with a tactual feedback.

The (digital) pen sensor 254 may be, for example, a part of the touch panel 252 or a separate recognition sheet. The key 256 may include, for example, a physical button, an optical key, or a keypad. The ultrasonic input unit 258 may sense ultrasonic waves generated from an input tool, through a microphone (for example, a microphone 288), and determine data corresponding to the sensed ultrasonic waves.

The display 260 may display, for example, various kinds of contents (for example, text, images, video, icons, symbols, etc.) for a user, and may include a panel 262, a hologram device 264, or a projector 266.

The panel 262 may include, for example, a Liquid Crystal Display (LCD), a Light-Emitting Diode (LED) display, an Organic Light-Emitting Diode (OLED) display, microelectromechanical systems (MEMS) display, and/or an electronic paper display.

The panel 262 may be implemented to be, for example, flexible, transparent, or wearable.

According to an embodiment, the panel 262 may include a touch screen, and may receive a touch input, a gesture input, a proximity input, or a hovering input using, for example, an electronic pen or a user's body part. Furthermore, according to an embodiment, the panel 262 may be integrated into the touch panel 252.

The hologram device 264 may show 3D images in the air using the interference of light. The projector 266 may project light onto a screen to display images. The screen may be provided, for example, inside or outside the electronic device 201.

According to an embodiment, the display 260 may further include a control circuit for controlling the panel 262, the hologram device 264, or the projector 266.

The interface 270 may include, for example, a High-Definition Multimedia Interface (HDMI) 272, Universal Serial Bus (USB) 274, an optical interface 276, and/or D-subminiature (D-sub) 278.

Additionally or alternatively, the interface 270 may include, for example, a Mobile High-definition Link (MHL) interface, a Secure Digital (SD) card/Multi-Media Card (MMC) interface, and/or an Infrared Data Association (IrDA)-based interface.

The audio module 280 may convert sound into an electrical signal and vice versa. The audio module 280 may process sound information input or output through, for example, a speaker 282, a receiver 284, earphones 286, the microphone 288, etc.

The microphone 288 may receive voice from a user, and create an electrical signal. According to an embodiment, the microphone 288 may include a directional microphone and/or a microphone array.

The camera module 291 may photograph, for example, still images and moving images. According to an embodiment, the camera module 291 may include at least one image sensor (for example, a front sensor or a rear sensor), a lens, an Image Signal Processor (ISP), and/or a flash (for example, a LED, a xenon lamp, or the like).

The camera module 291 may photograph a subject including a user to create image data. According to an embodiment, the camera module 291 may acquire an image in a direction in which the display faces.

The power management module 295 may manage power of, for example, the electronic device 201.

The power management module 295 may include an antenna for receiving power transmitted from the cradle 601, and charge a battery in a wireless fashion according to a wireless charging method. The wireless charging method may include, for example, a magnetic resonance method, a magnetic induction method, an electromagnetic method, etc. The power management module 295 may further include an additional circuit for wireless charging, for example, a coil loop, a resonance circuit, a rectifier, etc.

The power management module 295 may include a wireless power receiver 295a to wirelessly receive power from the wireless power transmitter of the cradle 601 to charge the battery of the electronic device 201.

The wireless power receiver 295a may wirelessly receive power using one or more wireless power transfer methods.

For example, the wireless power receiver 295a may receive power using an inductive coupling method based on magnetic induction. Herein, the inductive coupling method is to receive power by inducing, through a magnetic field changing in a coil, current to another coil, due to magnetic induction.

The wireless power receiver 295a may receive power using a resonant coupling method based on magnetic resonance caused by a wireless power signal of a specific frequency. Herein, the resonant coupling method is a method in which resonance occurs in a wireless power receiver due to a wireless power signal transmitted from a wireless power transmitter, and power is transferred to the wireless power receiver from the wireless power transmitter due to the resonance.

When the electronic device 201 is placed on the cradle 601, the wireless power receiver 295a may receive a pulse signal transmitted from the cradle 601. Specifically, an antenna of the wireless power receiver 295a may receive a pulse signal transmitted at regular time intervals from the cradle 601, and request the cradle 601 to transmit wireless power. In response to the request for transmission of wireless power, the cradle 601 may wirelessly transmit power, and the electronic device 201 may wirelessly receive the power.

The battery 296 may include, for example, a rechargeable battery and/or a solar battery.

The indicator 297 may display an operating state, for example, a booting state, a message state, a charged state, etc. of the electronic device 201 and/or a component (for example, the processor 210) of the electronic device 201.

The motor 298 may convert an electrical signal into mechanical vibrations, and generate vibrations, a haptic effect, etc.

Although not shown in the drawings, the electronic device 201 may include a processor (for example, GPU) for supporting a mobile TV. The processor for supporting the mobile TV can process media data according to a standard, such as, for example, Digital Multimedia Broadcasting (DMB), Digital Video Broadcasting (DVB), or mediaFlo™.

Figure 9:
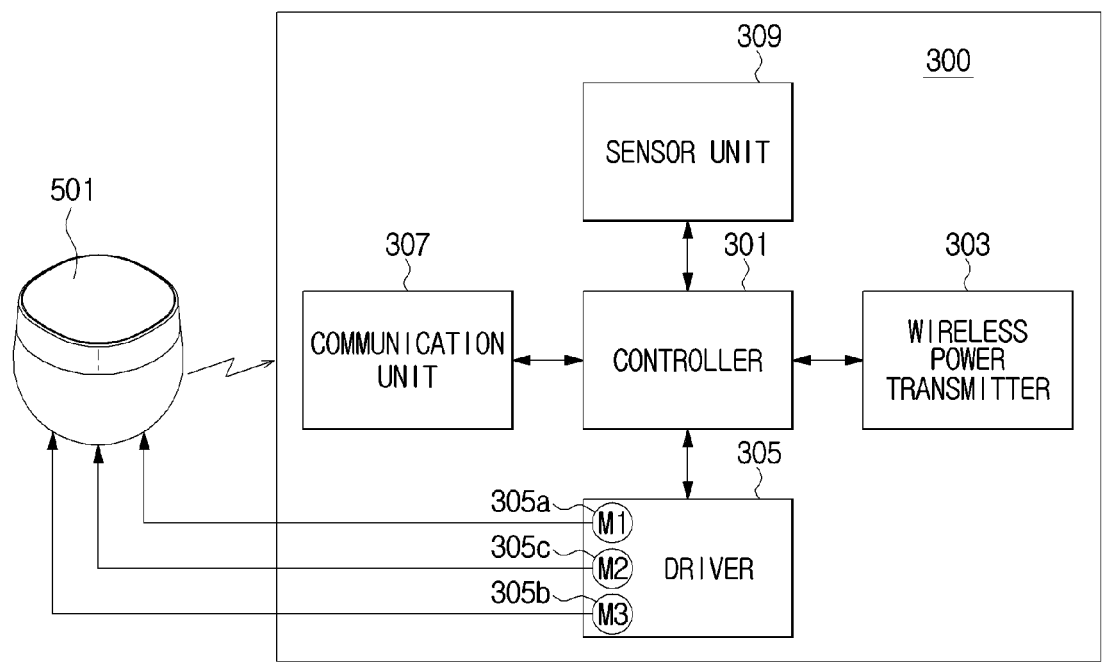
FIG. 9 is a block diagram of a cradle of an electronic device, according to an embodiment.

FIG. 9 is a block diagram of a cradle of an electronic device, according to an embodiment.

Referring to FIG. 9, a cradle 300 may include a controller 301, a wireless power transmitter 303, a driver 305, a communication unit 307, and a sensor unit 309.

The communication unit 307 may transmit/receive at least one data to/from an electronic device 501 through wireless communication. Specifically, the communication unit 307 may communicate with the electronic device 501 according to at least one communication standard (for example, a protocol, such as WiFi, Zigbee, Bluetooth, Long Term Evolution (LTE), 3G, IR, etc.). The communication unit 307 may receive information regarding an orientation of the electronic device 501 and information regarding a target orientation of the electronic device 501, transmitted from the electronic device 501.

The wireless communication may include, for example, cellular communication. The cellular communication may include at least one of LTE, LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), etc.

The wireless communication may include, for example, short-range communication. The short-range communication may include at least one of, for example, WiFi, Bluetooth, NFC, etc.

The wireless communication may include GNSS. The GNSS may include at least one of, for example, GPS, Glonass (Global Navigation Satellite System), and Beidou Navigation Satellite System (Galileo, the European global satellite-based navigation system), according to regions or bandwidths.

The wireless power transmitter 303 may include an antenna, and wirelessly transmit power to the electronic device 501. Furthermore, the wireless power transmitter 303 may transmit a pulse signal at regular time intervals, and receive a response signal responding to the pulse signal from the electronic device 501.

A driver 305 may include a driving circuit to supply driving current to motors 305a, 305b and 305c for rotating driving legs. The driving legs may be mounted on a stand in such a way to be rotatable. The motors 305a, 305b and 305c may be provided to correspond to the driving legs. For example, the driver 305 may include three motors 305a, 305b, and 305c, and the respective motors 305a, 305b, and 305c may drive the respective driving legs. The respective driving legs may physically contact the outer surface of the electronic device 501 to change an orientation of the electronic device 501.

For example, the driver 305 may include a motor for rotating the driving legs. If there are three driving legs, the driver 305 may include three motors.

The driving circuit may provide driving current to the plurality of motors 305a, 305b and 305c according to a control signal (for example, a signal related to the rotation directions and rotation velocities of the motors) from the controller 301.

The driving circuit may include a switch device, an inverter circuit, etc. to control driving current that is supplied to the plurality of motors 305a, 305b and 305c. Furthermore, a single driving circuit may supply driving current to all of the plurality of motors, or a plurality of driving circuits may supply driving current to the respective motors.

The driver 305 may control the rotation directions and rotation velocities of the individual motors 305a, 305b and 305c, based on data transmitted from the controller 301.

The controller 301 may control overall operations of the cradle 300.

The controller 301 may control the rotation directions and rotation velocities of the motors included in the driver 305, based on data received from the electronic device 501 through the communication unit 307. Specifically, the controller 301 may receive information regarding an orientation of the electronic device 501 and information regarding a target orientation of the electronic device 501 through the communication unit 307, and create control data for changing the orientation of the electronic device 501 to the target position. The controller 301 may control the driver 305 based on the control data to change the orientation of the electronic device 501. The controller 301 may change the orientation of the electronic device 501 until the orientation of the electronic device 501 reaches the target position.

If no information regarding the orientation of the electronic device 501 is received, the controller 301 may control the driver 305 based on the previously received information regarding the orientation of the electronic device 501. The controller 301 may change the orientation of the electronic device 501 while receiving feedback information regarding the changed orientation from the electronic device 501, thereby changing the orientation of the electronic device 501 to the target position. However, because information regarding the orientation of the electronic device 501 is wirelessly transmitted from the electronic device 501, a situation may occur in which no information regarding the orientation of the electronic device 501 is received from the electronic device 501, due to noise. In this situation, the controller 301 of the cradle 300 may predict the next orientation of the electronic device 501 based on the previously received information regarding the orientation of the electronic device 501, and drive the motor using the predicted orientation information to thus change the orientation of the electronic device 501.

According to an embodiment, the electronic device 201 may create control data for controlling the driver 305 of the cradle 300, and transmit the control data to the cradle 300. Then, the controller 301 of the cradle 300 may control the driver 305 using the control data received from the electronic device 501 to change the orientation of the electronic device 501.

When the electronic device 501 is placed on the cradle 300, the controller 301 may transmit power to the electronic device 501 through the wireless power transmitter 303. The controller 301 may control the wireless power transmitter 303 to transmit power to the electronic device 300, based on a response signal responding to a pulse signal received from the electronic device 501 through the wireless power transmitter 303.

The controller 301 may include a processor, a memory, etc. The processor may include an Arithmetic and Logic Unit (ALU) to perform operations for processing data, and a memorial circuit to memorize operated data or data to be operated. Furthermore, the memory may include, for example, a volatile memory (for example, SRAM, DRAM, etc.), and a non-volatile memory (for example, a flash memory, ROM, EPROM, EEPROM, etc.).

The processor and memory may be implemented as separate chips or integrated into a single chip such as System on Chip (SoC).

The sensor unit 309 may include, for example, an approximation sensor or a contact sensor. When the electronic device 501 is placed on the cradle 300, the sensor unit 309 may sense the operation to output a signal, and the controller 301 may receive the signal to recognize that the electronic device 501 is placed on the cradle 300.

The sensor unit 309 may determine that the electronic device 501 is placed on the cradle 300, using various methods.

For example, the sensor unit 309 may include a capacitance sensor to sense a change in capacitance caused by the electronic device 501. If the electronic device 501 is placed on the cradle 300, the capacitance sensor may sense a change in capacitance caused by the electronic device 501 to output a signal, and the controller 301 may receive the signal to recognize that the electronic device 501 is placed on the cradle 300.

The sensor unit 309 may include a hall sensor to sense a magnetic field formed by a magnet of the electronic device 501. When the electronic device 501 is placed on the cradle 300, the hall sensor may sense a magnetic field emerging from the magnet of the electronic device 501 to output a signal, and the controller 309 may receive the signal to recognize that the electronic device 501 is placed on the cradle 300.

The controller 301 may transmit power to the electronic device 501 through the wireless power transmitter 303, based on a signal output from the sensor unit 309.

Figure 10A:
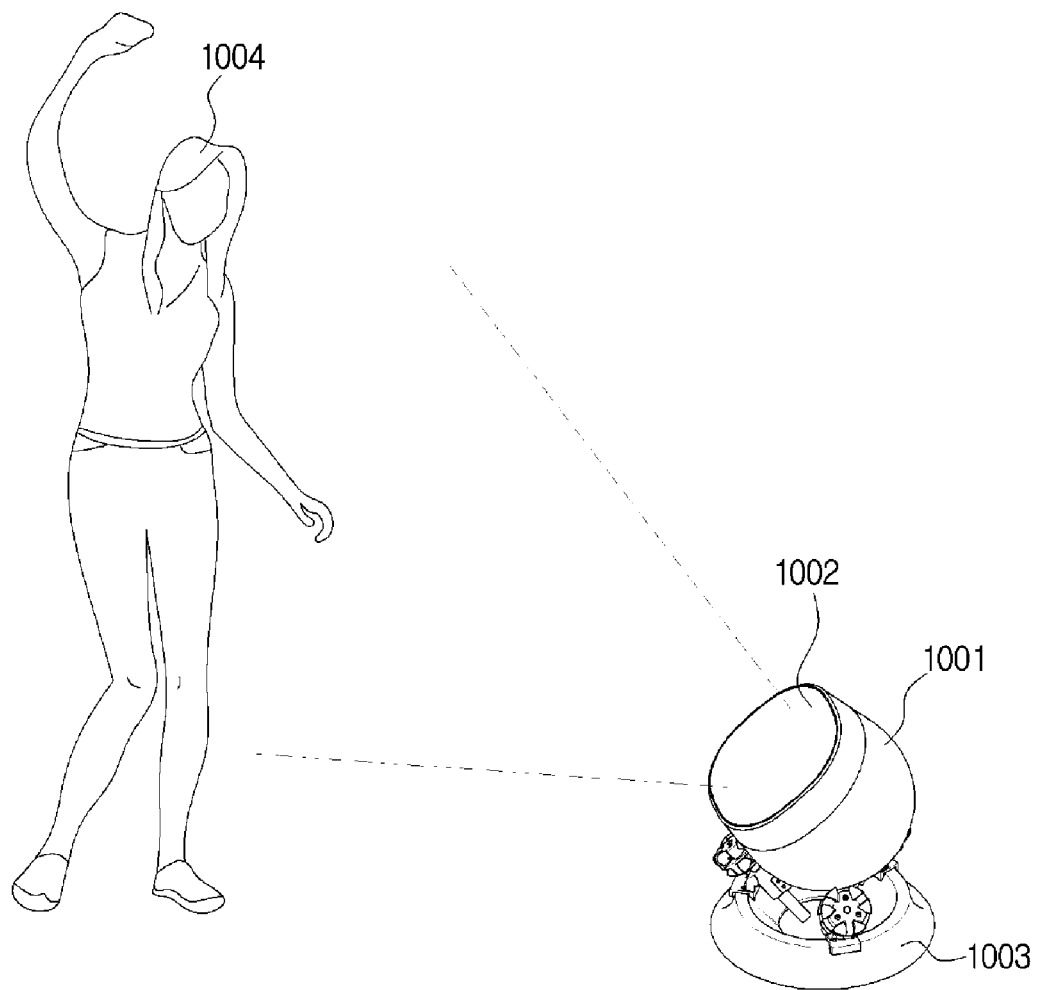
FIGS. 10A and 10B show examples in which an electronic device according to an embodiment is driven.
Figure 10B:
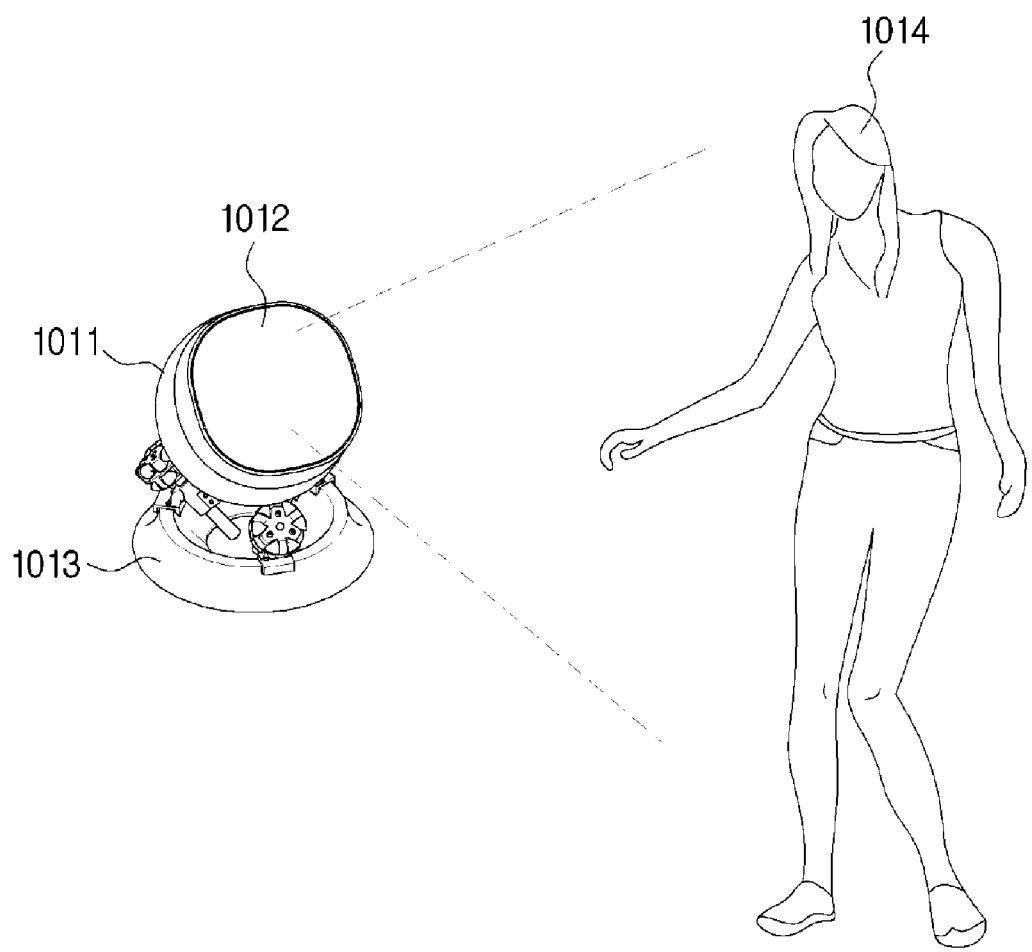

FIGS. 10A and 10B show examples in which an electronic device according to an embodiment is driven.

In FIG. 10A, an electronic device 1001, a cradle 1003, and a user 1004 are shown.

The user 1004 may be located to the left of the electronic device 1001, and a front cover 1002 of the electronic device 1001 may face the user 1004. Specifically, the front cover 1002 may face the user's face.

That is, the electronic device 1001 may identify the user 1004, and control a driver of the cradle 1003 such that a display disposed in the inside of the front cover 1002 faces the user 1004, to thereby change the orientation of the electronic device 1001. Specifically, the electronic device 1001 may control the driver of the cradle 1003 such that the display disposed in the inside of the front cover 1002 faces the user's face, to thereby change the orientation of the electronic device 1001.

If the user 1004 moves, the electronic device 1001 may trace the user 1004 to change the orientation of the electronic device 1001. That is, the electronic device 1001 may control the driver of the cradle 1003 such that the display faces the user's face, to change the orientation of the electronic device 1001.

Referring to FIG. 10B, an electronic device 1011, a cradle 1013, and a user 1014 are shown.

If the user 1014 moves from the left of the electronic device 1011 to the right of the electronic device 1011, the electronic device 1011 may trace the user 1014 to change the orientation of the electronic device 1013 such that a front cover 1012 faces a right direction from a left direction.

Specifically, in the inside of the front cover 1012, a display and a camera module may be disposed. An image photographed by a camera may be transferred to a processor, and the processor may analyze the photographed image to recognize the user's location, and control the driver of the cradle 1013 to change the orientation of the electronic device 1013 such that the display faces the user.

Figure 11:
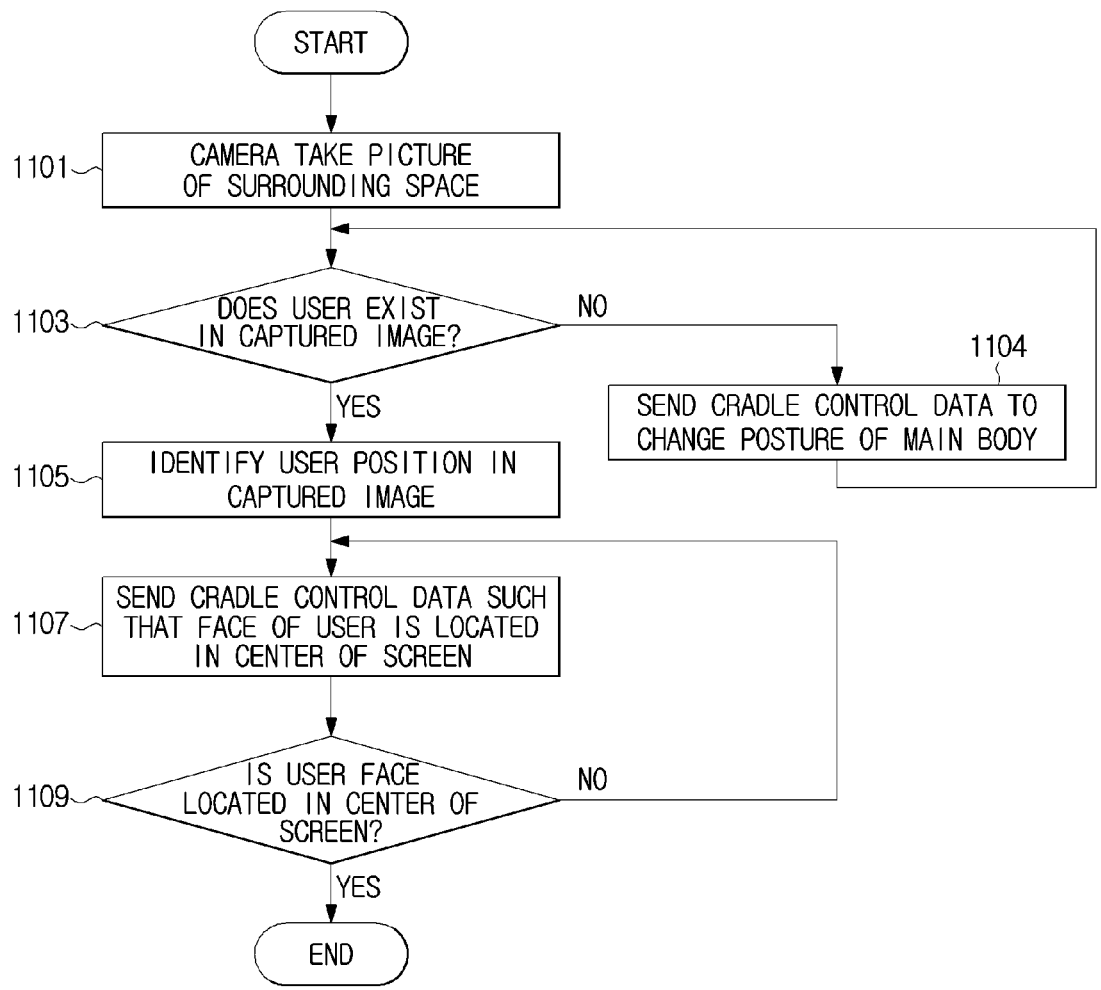
FIG. 11 is a flowchart illustrating a method in which an electronic device according to an embodiment is driven.
Figure 12A:
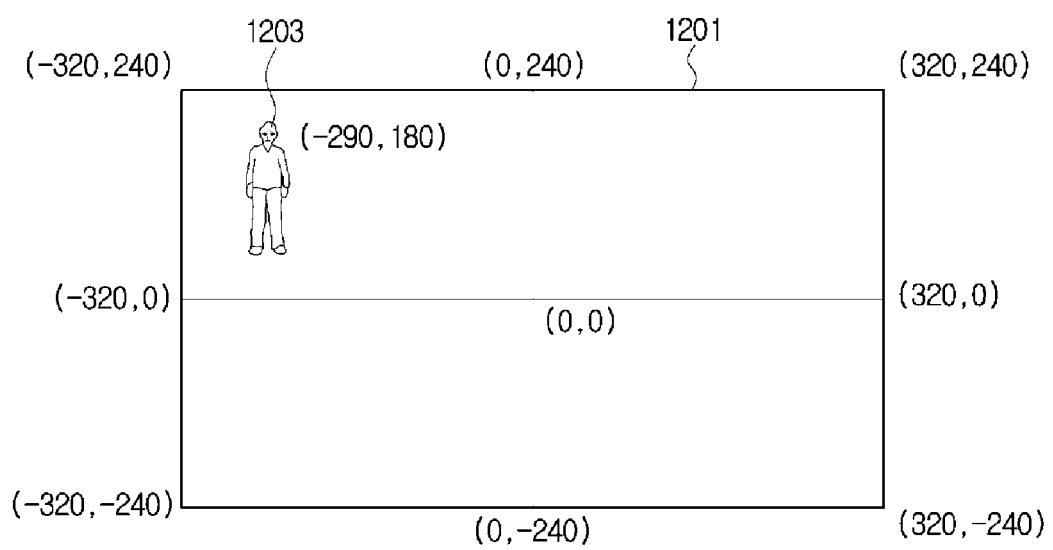
FIGS. 12A and 12B show examples of images including a user, acquired by an electronic device according to an embodiment.
Figure 12B:
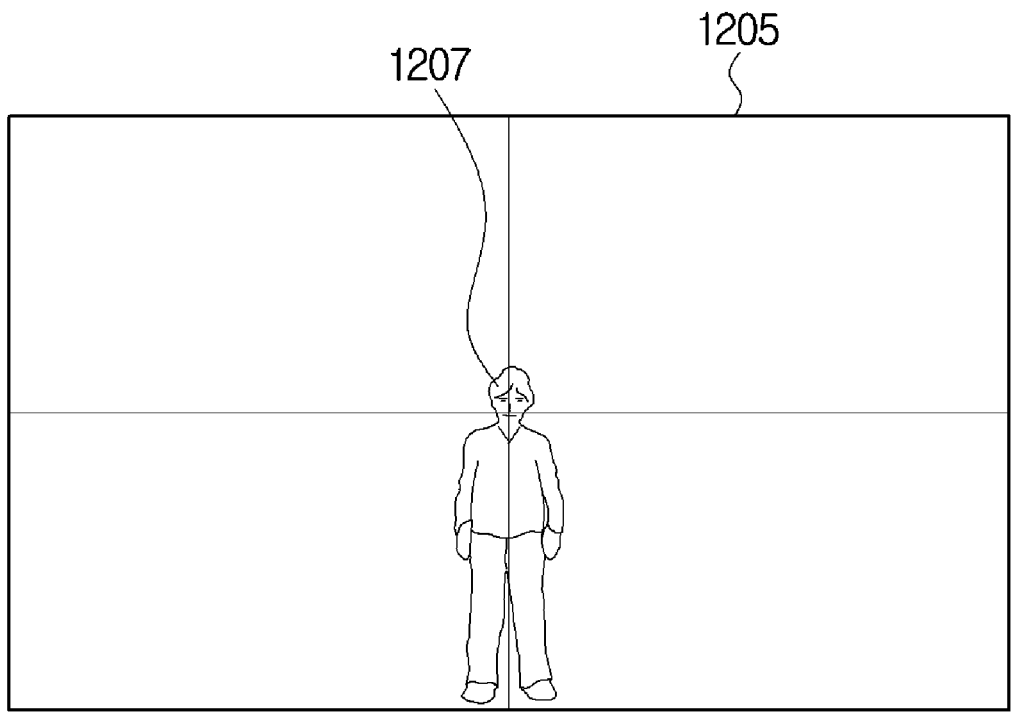

FIG. 11 is a flowchart illustrating a method in which an electronic device according to an embodiment is driven. FIGS. 12A and 12B show examples of images including a user, acquired by an electronic device according to an embodiment.

Referring to FIG. 11, a camera of the electronic device may take picture of surrounding space to acquire an image, in operation 1101. The camera may transmit the image to a processor. The processor may perform image recognition processing on the image to identify a user.

The processor may determine whether a user exists in the captured image, in operation 1103. The processor may process the image to thereby determine whether a user exists in the image.

If the processor determines that no user exist in the image, the process may proceed to operation 1104. In operation 1104, the processor may transmit control data to a cradle to change the orientation of the electronic device.

Specifically, the processor may transmit control data, for controlling a driver of the cradle to change the orientation of the electronic device to a predetermined range, to the cradle. The processor may convert the control data into a format suitable for a predetermined protocol of a communication module, and transmit the processed control data to the communication module. The communication module may transmit the control data to the cradle, according to the predetermined protocol.

For example, the processor may process the control data to be suitable for a Bluetooth protocol, and transmit the control data according to a Bluetooth communication method through a communication unit. As another example, the processor may process the control data to be suitable for a WiFi protocol, and transmit the control data according to a WiFi communication method through the communication unit.

If the processor determines that a user exists in the image, the processor may identify the user position in the captured image, in operation 1105.

The processor may determine the user's location on the image.

For example, the processor may set the center of the image to a reference point of coordinates, and determine the user's location with respect to the reference point of coordinates.

Referring to FIG. 12A, for example, the processor may set the center of an image 1201 to coordinates (0, 0), the upper left end of the image to coordinates (−320, 240), the upper right end of the image to coordinates (320, 240), the lower left end of the image to coordinates (−320, −240), and the lower right end of the image to coordinates (320, −240). Then, the processor may process the image to determine coordinates of the user's location 1203. In the image, the coordinates of the user's location are determined as (−290, 180).

In operation 1107, the processor may send control data to the cradle such that the face of the user is located in the center of the image.

The processor may determine coordinates of the user's location with respect to the coordinates of the center of the image, calculate control data for controlling the driver of the cradle based on a distance of the user's location to the center of the image, and transmit the calculated control data to the cradle.

According to an embodiment, the processor may transmit information regarding a current orientation and information regarding a target orientation to the cradle through the communication unit. In this case, control data for controlling the driver of the cradle may be created by the controller of the cradle.

Referring to FIG. 12A, the user's location may be spaced by a distance of (−290, 180) from the center of the image. The processor may create control data corresponding to the distance, and wirelessly transmit the control data to the cradle through the communication module. The cradle may change the orientation of the electronic device based on the control data transmitted from the electronic device, and control a motor of the driver to change the orientation of the electronic device such that the user's face is located in the center of the image.

In operation 1109, the processor may determine whether the user's face 1207 is located in the center of an image 1205 (see FIG. 12B). If the processor determines that the user's face is located in the center of an image, the processor may stop operating the motor of the driver of the cradle. If the processor determines that the user's face is not located in the center of an image, the processor may repeatedly perform operations 1107 and 1109.

Figure 13:
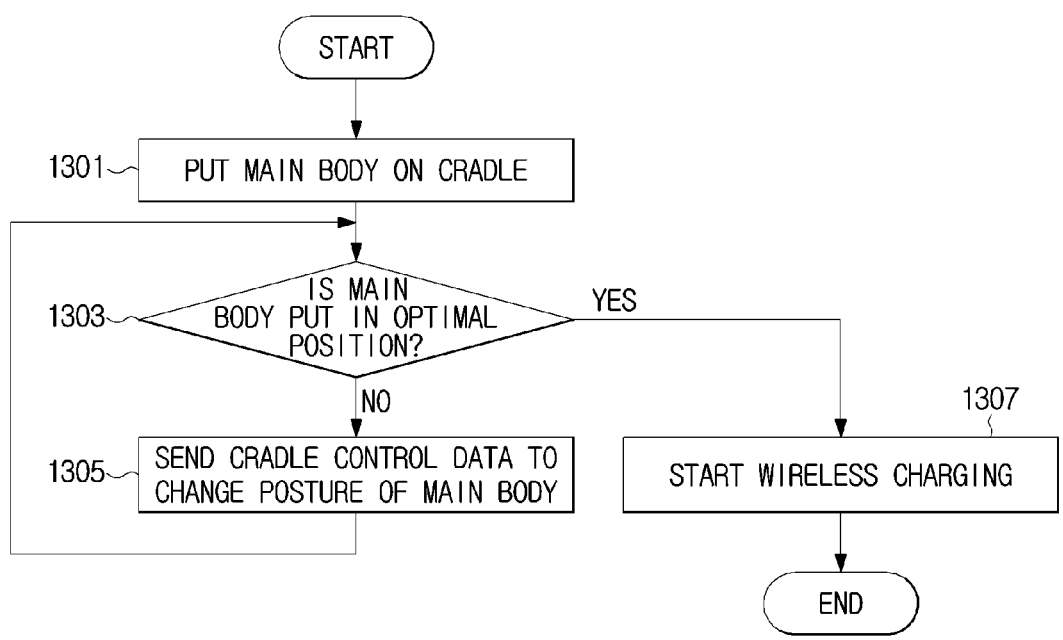
FIG. 13 is a flowchart illustrating a method of starting wireless charging when an electronic device is placed on a cradle.

FIG. 13 is a flowchart illustrating a method of starting wireless charging when an electronic device is placed on a cradle.

The electronic device may include a wireless power receiver to charge a battery in a wireless fashion.

For example, the wireless power receiver may receive power using an inductive coupling method based on magnetic induction. Herein, the inductive coupling method is to receive power by inducing, through a magnetic field changing in a coil, current to another coil, due to magnetic induction.

As another example, the wireless power receiver may receive power using a resonant coupling method. Herein, the resonant coupling method is a method in which resonance occurs in a wireless power receiver due to a wireless power signal transmitted from a wireless power transmitter, and power is transferred to the wireless power receiver from the wireless power transmitter due to the resonance.

In order to increase the efficiency of wireless charging, the location of a transmission coil of the cradle to transmit power and the location of a reception coil of the electronic device to receive power are important. That is, when the transmission coil and the reception coil are positioned at optimal locations, the efficiency of wireless charging can increase.

The electronic device may transmit control data for changing the orientation of the electronic device, to the cradle, in order to increase the efficiency of wireless charging. That is, the electronic device may transmit data for controlling the orientation of the electronic device to the cradle, based on the efficiency of wireless charging.

In operation 1301, a processor may determine that the electronic device is put on the cradle.

For example, when the electronic device is placed on the cradle, a signal may be output from an approximation sensor of a sensor module. The processor may determine that the electronic device is placed on the cradle, based on the signal output from the sensor module.

As another example, when the electronic device is placed on the cradle, an approximation sensor included in the cradle may sense the operation to output a signal, and a controller of the cradle may receive the signal to determine that the electronic device is placed on the cradle, and transmit data to the electronic device. The electronic device may receive the data from the cradle, and determine that the electronic device is placed on the cradle.

As another example, when the electronic device is placed on the cradle, a hall sensor included in the cradle may sense the operation to output a signal, and the controller of the cradle may receive the signal to recognize that the electronic device is placed on the cradle, and transmit data to the electronic device. The electronic device may receive the data from the cradle, and determine that the electronic device is placed on the cradle. The hall sensor may sense a magnetic field generated from a magnet included in the electronic device, and determine that the electronic device is placed on the cradle.

As another example, a wireless power transmitter included in the cradle may output a pulse signal before transmitting power. When the electronic device is placed on the cradle, the electronic device may receive the pulse signal, and output a response signal responding to the pulse signal to the cradle. If the electronic device receives the pulse signal, the electronic device may determine that it is placed on the cradle.

In operation 1303, the electronic device may determine whether it is put on the cradle at an optimal location. The optimal location may be a location at which the efficiency of wireless charging of the electronic device is highest.

The processor may change the orientation of the electronic device to increase the efficiency of wireless charging. That is, the processor may change the orientation of the electronic device based on the efficiency of wireless charging.

In operation 1303, if the electronic device determines that it is not placed at the optimal location, the processor may send control data for changing the orientation of the electronic device to increase the efficiency of wireless charging, to the cradle, in operation 1305. The cradle may control a motor of a driver based on the control data to change the orientation of the electronic device.

In operation 1303, if the electronic device determines that it is located at the optimal location, the processor may start wireless charging, in operation 1307.

Figure 14:
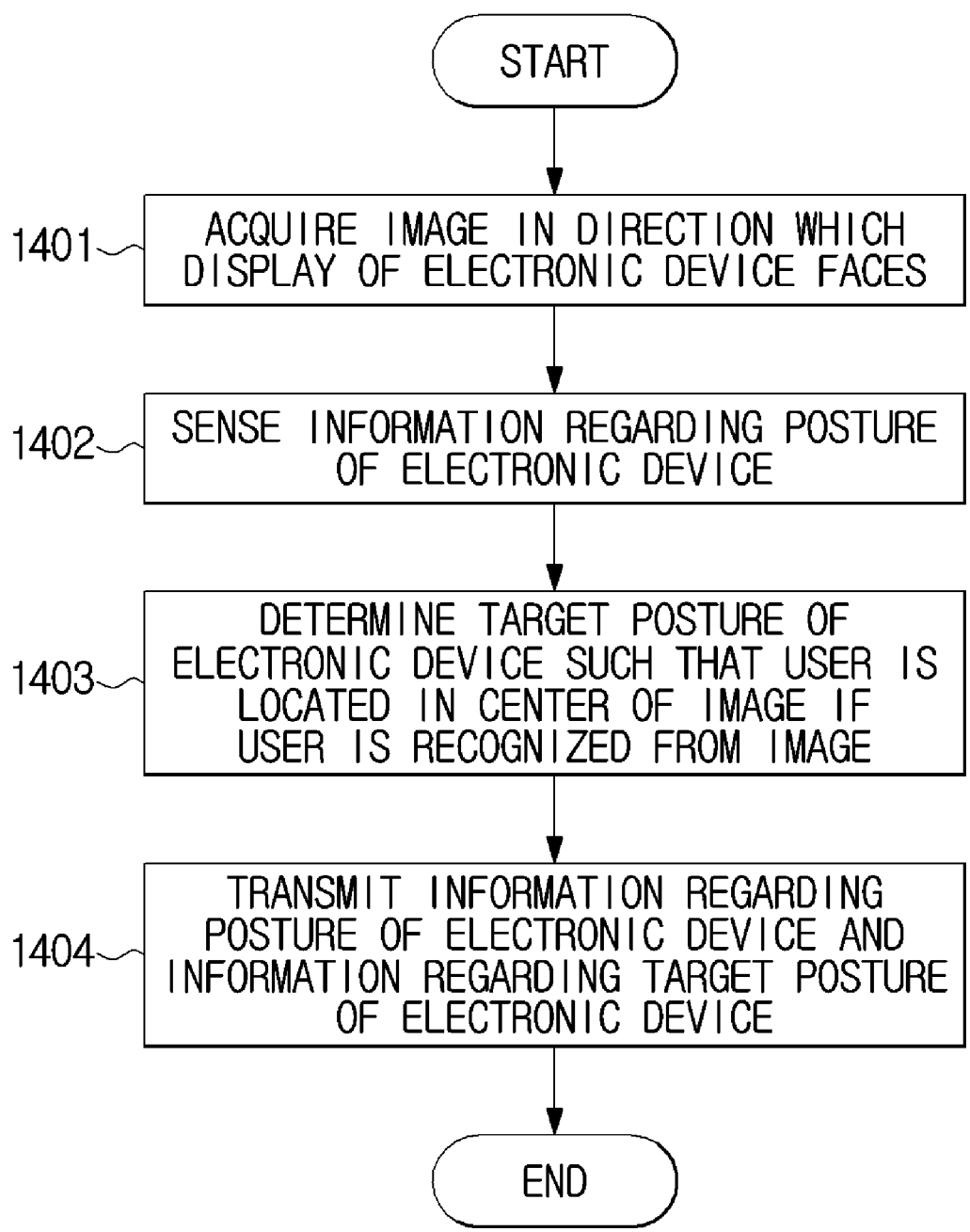
FIG. 14 is a flowchart illustrating a method of controlling an electronic device.

FIG. 14 is a flowchart illustrating a method of controlling an electronic device.

Referring to FIG. 14, the electronic device may acquire an image in a direction which a display of the electronic device faces, in operation 1401. A camera may acquire an image in a direction in which it interacts with a user. The camera may be disposed adjacent to the display. Accordingly, a direction which the camera faces may be the same direction which the display faces, and an image may be acquired in the direction which the display faces through the camera.

The electronic device may sense its own orientation to acquire orientation information, in operation 1402. The orientation information of the electronic device may be acquired through a sensor module. Specifically, a processor may acquire data regarding an orientation of the electronic device from a gyro sensor and an acceleration sensor included in the sensor module, and determine a current orientation of the electronic device based on the acquired data.

The electronic device may determine a target orientation of the electronic device such that the electronic device faces the user, in operation 1403.

For example, the electronic device may analyze an image acquired through a camera module, and if a user is recognized from the image, the electronic device may determine a target orientation of the electronic device such that the user is located in the center of the image. For example, if a user is located in the upper left end of a screen with respect to the center of the screen in an image acquired through the camera module, the electronic device may determine a degree of change in orientation of the electronic device for locating the user in the center of the screen, and set the degree of change in orientation to a target position.

If no user is recognized from the image, the electronic device may change the orientation of the electronic device to a predetermined range, and photograph space in a direction which the display faces at the changed position, through the camera, to acquire a new image. Then, the electronic device may determine whether a user is recognized from the newly acquired image, and if a user is recognized from the newly acquired image, the electronic device may determine a target orientation of the electronic device such that the user is located in the center of the image. If no user is recognized from the newly acquired image, the electronic device may again change the orientation of the electronic device to the predetermined range, and then again acquire a new image.

As another example, the electronic device may determine a target orientation of the electronic device based on a direction in which voice input through a microphone utters. According to an embodiment, the electronic device may identify a user from various signals input through the microphone. If the user's voice is identified, the electronic device may transmit control data to the cradle through a communication unit in order to change the orientation of the electronic device 201 to a direction in which the user's voice is maximized.

In operation 1404, the electronic device may transmit information regarding the orientation of the electronic device and information regarding the target orientation of the electronic device to the cradle.

The electronic device transmitting information to the cradle refers to the electronic device transmitting information to the cradle in the state in which the electronic device is paired with the cradle.

The electronic device may determine that it is placed on the cradle functionally connected to itself, based on data output from the sensor module. For example, the electronic device may determine that it is placed on the cradle, based on a signal output from an approximation sensor included in the sensor module.

The electronic device may determine that it is placed on the cradle, when a wireless power receiver detects a signal.

Figure 15:
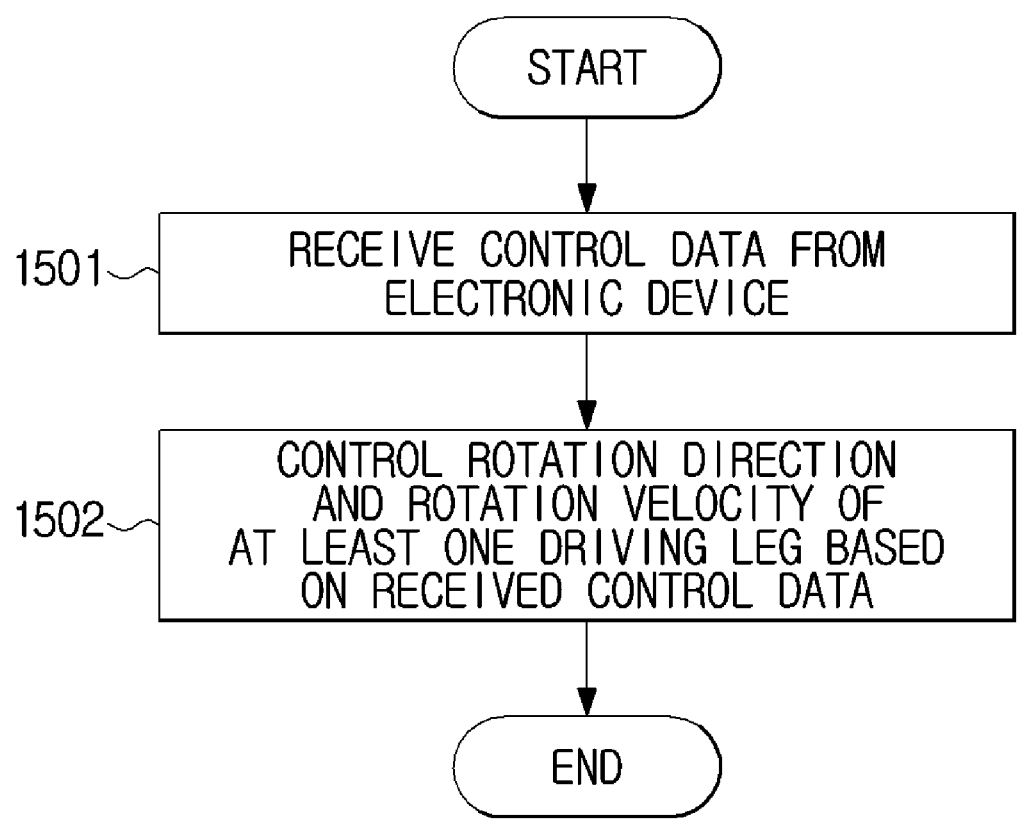
FIG. 15 is a flowchart illustrating a method in which a cradle drives a driver based on data received from an electronic device.

FIG. 15 is a flowchart illustrating a method in which a cradle drives a driver based on data received from an electronic device.

Referring to FIG. 15, the cradle may receive control data from the electronic device, in operation 1501.

The control data may include information regarding a current orientation of the electronic device and information regarding a target orientation of the electronic device.

If the cradle receives the information regarding the current orientation of the electronic device and the information regarding the target orientation of the electronic device from the electronic device, the cradle may create driving data for a driver for changing the orientation of the electronic device, based on the information regarding the current orientation of the electronic device and the information regarding the target orientation of the electronic device. The cradle may drive at least one motor connected to the driver to change the orientation of the electronic device.

If the orientation of the electronic device changes, the electronic device may transmit information regarding its own changed orientation sensed by a sensor module to the cradle through a communication unit. If the cradle receives the information regarding the changed orientation of the electronic device, the cradle may again drive the driver, based on the newly received information regarding the orientation of the electronic device and the information regarding the target orientation of the electronic device, to continue to change the orientation of the electronic device until the orientation of the electronic device reaches the target position.

The cradle may rotate driving legs using a rotational force of a motor included in the driver to change the orientation of the electronic device. The electronic device may physically contact wheels of the driving legs.

Because the information regarding the current orientation of the electronic device is wirelessly transmitted to the cradle, there may occur a situation in which the cradle receives no information regarding the orientation of the electronic device due to noise. In this situation, the cradle may predict information regarding a new orientation of the electronic device based on the previously received information regarding the orientation of the electronic device. For example, it is assumed that information regarding an orientation of the electronic device received at a time n is a, information regarding an orientation of the electronic device received at a time n+1 is a+1, and information regarding an orientation of the electronic device received at a time n+2 is a+2. In this case, if the cradle fails to receive information regarding an orientation of the electronic device at a time n+3, the cradle may predict information regarding an orientation of the electronic device at the time n+3, as a+3, based on the information a, a+1, and a+2 about the positions of the electronic device received respectively at the times n, n+1, and n+2.

According to an embodiment, the control data may include driving data for driving the driver of the cradle to change the orientation of the electronic device to a target position. The cradle may change rotation directions and rotation velocities of at least one of driving legs, based on data received from the electronic device, in operation 1502.

For example, the cradle may calculate a target motion of the electronic device, based on a difference between information regarding a current orientation and information regarding a target position, received from the electronic device. Herein, the target motion may include a direction in which and a degree of change by which the orientation of the electronic device needs to change in order to make the orientation of the electronic device become the target position. Furthermore, the cradle may change a rotation direction, rotation velocity, and rotation torque of at least one of driving legs, based on the target motion of the electronic device.

According to an aspect of the present disclosure, there are provided an electronic device and a cradle thereof, wherein the electronic device has an outer appearance to allow a user to easily possess it, and a motion of the electronic device can be controlled by a driver included in the cradle when the electronic device is placed on the cradle.

Because the housing of the electronic device according to an embodiment is in the shape of a hemisphere, no separate mechanical structure for coupling the electronic device with the cradle is needed when the electronic device is placed on the cradle, and a user can put the electronic device on the cradle without paying attention to the orientation of the electronic device.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An electronic apparatus, comprising:
   a cradle; and
   an electronic device capable of being placed on the cradle and including a hemispherical surface, wherein the electronic device includes:
   a camera module configured to acquire an image;
   a sensor module configured to sense an orientation of the electronic apparatus;
   a processor configured to determine a target orientation of the electronic apparatus based on the acquired image; and
   a communication module configured to transmit information regarding the sensed orientation of the electronic apparatus and information regarding the determined target orientation of the electronic apparatus to the cradle for the electronic apparatus and wherein the cradle includes:
   a communication unit configured to receive the information regarding the sensed orientation of the electronic device and the information regarding the determined target orientation of the electronic device from the electronic device;
   a plurality of driving legs, each of which is arranged to contact with the hemispherical surface of the electronic device;
   a driver configure to rotate the plurality of driving legs; and
   a controller configured to control the driver to rotate at least one driving leg among the plurality of driving legs to move the electronic device to the determined target orientation, based on the information regarding the sensed orientation of the electronic device and the information regarding the determined target orientation of the electronic device.

2. The electronic apparatus according to claim 1, wherein the electronic device further comprises a microphone configured to receive audio,
wherein the processor determines the target orientation of the electronic apparatus based on a direction from which the audio is received by the microphone.

3. The electronic apparatus according to claim 1, wherein the communication module is further configured to transmit information regarding at least one of a velocity of the electronic apparatus that is sensed by the sensor module and an acceleration of the electronic apparatus that is sensed by the sensor module to the cradle.

4. The electronic apparatus according to claim 1, wherein the processor is configured to determine the target orientation of the electronic apparatus such that an image of a user recognized in the acquired image is located in a center of an image subsequently acquired by the camera module.

5. The electronic apparatus according to claim 1, wherein the processor is further configured to determine that the electronic apparatus is placed on the cradle using the sensor module.

6. The electronic apparatus according to claim 1, wherein the controller is configured to control the driver the driver to change at least one of the rotation direction, the rotation velocity, and a rotation torque of the plurality of driving legs based on information regarding the target orientation of the electronic apparatus.

7. The electronic apparatus according to claim 1, wherein in response to no new information regarding the orientation of the electronic apparatus being received by the communication unit, the controller is configured to control the driver based on previously received information regarding the orientation of the electronic apparatus.

8. A method for controlling an electronic apparatus including a cradle and an electronic device, the method comprising:
acquiring, by the electronic device capable of being placed on the cradle and including a hemispherical surface, an image using the electronic apparatus;
sensing, by the electronic device, an orientation of the electronic apparatus in the cradle using a sensor module in the electronic apparatus;
determining, by the electronic apparatus, a target orientation of the electronic apparatus such that an image of a user recognized in the acquired image is located in a center of an image subsequently acquired by the electronic apparatus; and
transmitting, by the electronic device, the information regarding the sensed orientation of the electronic apparatus and information regarding the determined target orientation of the electronic apparatus from the electronic apparatus to the cradle for the cradle to move the electronic apparatus to the determined target orientation; and
controlling a rotation direction and a rotation velocity of at least one driving leg among a plurality of driving legs of the cradle, each of which is arranged to contact with the hemispherical surface of the electronic device, based on the information regarding the orientation of the electronic device and the information regarding the target orientation of the electronic device for the cradle to move the electronic device to the determined target orientation.

9. The method according to claim 8, further comprising determining, by the electronic device, the target orientation of the electronic apparatus based on a direction from which audio received by a microphone is received.

10. The method according to claim 8, further comprising transmitting, by the electronic device, information regarding at least one of a velocity of the electronic apparatus that is sensed by the sensor module and an acceleration of the electronic apparatus that is sensed by the sensor module to the cradle.

11. The method according to claim 8, further comprising determining that the electronic apparatus is placed on the cradle, based on data output from the sensor module.

12. The method according to claim 8, further comprising determining that the electronic apparatus is placed on the cradle, based on a signal received from the cradle.

13. The method according to claim 8, further comprising, in response to no new information regarding the orientation of the electronic apparatus being received from the electronic apparatus, controlling the rotation direction and the rotation velocity of the at least one driving leg based on previously received information regarding the orientation of the electronic apparatus.

* * * * *